US007080628B2

(12) United States Patent

Kado et al.

(10) Patent No.: US 7,080,628 B2

(45) Date of Patent: Jul. 25, 2006

(54) INTAKE CONTROL DEVICE FOR INTERNAL COMBUSTION ENGINE

(75) Inventors: Hiroyuki Kado, Obu (JP); Isao Makino, Chiryu (JP); Hiroshi Tanimura, Kariya (JP); Hiroki Shimada, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/165,032

(22) Filed: Jun. 24, 2005

(65) Prior Publication Data

US 2006/0000443 A1 Jan. 5, 2006

(30) Foreign Application Priority Data

Jun. 30, 2004 (JP) ............................. 2004-193807
Jan. 31, 2005 (JP) ............................. 2005-023469

(51) Int. Cl.
*F02D 11/10* (2006.01)
*F16K 1/22* (2006.01)

(52) U.S. Cl. .................... 123/399; 29/890.13; 251/308

(58) Field of Classification Search ................ 123/336, 123/337, 361, 396, 399; 29/888.01, 890.13; 251/305, 308

See application file for complete search history.

(56) References Cited

U.S. PATENT DOCUMENTS 5,375,323 A * 12/1994 Sata .......................... 29/888.1
6,543,417 B1 4/2003 Tanaka et al. .............. 123/399
6,708,959 B1 * 3/2004 Dow ........................... 261/65
6,837,261 B1 * 1/2005 Rentschler et al. ......... 251/308

FOREIGN PATENT DOCUMENTS

JP 2003-83092 3/2003

* cited by examiner

*Primary Examiner*—T. M. Argenbright
(74) *Attorney, Agent, or Firm*—Nixon & Vanderhey P.C.

(57) ABSTRACT

An intake control device for an engine includes a throttle body that defines a throttle bore, which is substantially circular-shaped in cross section, through which intake air flows. A throttle valve is rotatably assembled in the throttle bore of the throttle body. The throttle valve rotates integrally with a shaft. One axial end of the shaft is connected to a rotary driver, so that the rotation angle of the throttle valve is changed via the shaft. The rotary driver defines a fitted hole, to which the one axial end of the shaft is clearance fitted. The rotary driver defines a fitting recess dented radially outward from the hole wall surface of the fitted hole. The one axial end of the shaft includes a coupling that is crimped and fixed to the rotary driver in the state of being fitted to the fitted hole.

12 Claims, 14 Drawing Sheets

INTAKE CONTROL DEVICE FOR INTERNAL COMBUSTION ENGINE

CROSS REFERENCE TO RELATED APPLICATIONS

This application is based on and incorporates herein by reference Japanese Patent Applications No. 2004-193807 filed on Jun. 30, 2004 and No. 2005-23469 filed on Jan. 31, 2005.

FIELD OF THE INVENTION

The present invention relates to an intake control device for an internal combustion engine, the intake control device controlling an amount of intake air drawn into a cylinder of an internal combustion engine. More particularly, the present invention relates to an intake control device, in which an actuator is driven in accordance with an accelerator position to control a rotation angle of a throttle valve rotatably accommodated in a throttle bore of a throttle body.

BACKGROUND OF THE INVENTION

A conventional throttle control device for an internal combustion engine is disclosed in U.S. Pat. No. 6,543,417B2 (JP-A-2002-371866). The throttle control device includes a throttle body, a throttle valve, and an engine control device. The throttle body defines therein a throttle bore having a circular-shaped cross section. The throttle valve is rotated by a motor to open and close an intake passage. The engine control device operates the motor in accordance with an accelerator position to control an opening degree of the throttle valve to be in a predetermined opening degree, so that engine control device controls engine speed.

As shown in FIGS. 13, 14, a conventional intake control device for an internal combustion engine includes a throttle body 101, a butterfly type throttle valve (not shown), a shaft 102, a power unit, a coil spring (not shown), and an engine control device (not shown). The butterfly type throttle valve opens and closes a throttle bore of the throttle body 101. The shaft 102, which is in a round bar shape, supports the throttle valve. The power unit operates the throttle valve in the opening direction or the closing direction. The coil spring biases the throttle valve in the closing direction. The engine control device operates a motor (not shown) in accordance with an accelerator position to control the angular position of the throttle valve to be in a predetermined position.

The power unit, which opens and closes the throttle valve, is constructed of a motor (drive source) and a power transmission mechanism (reduction gear). The power transmission mechanism is accommodated in a gearbox 103 connected with the throttle body 101. The reduction gear is constructed of a pinion gear 104 fixed to an output shaft of the motor, an intermediate reduction gear 105 engaging with the pinion gear 104, and a valve gear 106 engaging with the intermediate reduction gear 105. A throttle sensor is mounted to the gearbox 103 to detect an angular position of the throttle valve, that is, a throttle opening degree. The throttle sensor includes a permanent magnet (not shown) fixed to the inner periphery of the valve gear 106, and a non-contact type magnetism detecting element (not shown) that generates an electromotive force in response to a magnetic field generated by the permanent magnet. The non-contact type magnetism detecting element is fixed to a sensor mount part (not shown) of a sensor cover, which closes an opening side of the gearbox 103 of the throttle body 101, in a manner to be arranged in opposition to the inner peripheral surface of a yoke, which is magnetized by the permanent magnet.

As shown in FIG. 14, the valve gear 106 has the inner periphery, in which a fitted hole 110 is fitted onto a fitting part, which is provided to one end of the shaft 102. In the intake control device, flatted round portions 111, 112 are formed on the outer periphery of the fitting part of the shaft 102 and on the inner periphery of the fitted hole 110 of the valve gear 106. Thereby, the throttle valve, the shaft 102, and the valve gear 106 define a predetermined relative angle, and the shaft 102 and the valve gear 106 are restricted from rotating relative to each other. The valve gear 106 is joined to one axial end (the fitting part) of the shaft 102 by crimping the fitting part that extends through the fitted hole 110 to project from the end surface of the valve gear 106. A block-shaped full-closing stopper part 113 is integrally formed on the outer periphery of the valve gear 106. When the throttle valve is closed to a full-closing position, the full-closing stopper part 113 latches onto a block-shaped fully-closing stopper 107 provided integrally on the gearbox 103.

In the conventional intake control device, an adjustment structure needs to be provided in order to maintain a full-closing clearance defined between a throttle bore surface of the throttle body 101 and an outer peripheral end surface of the throttle valve at a desired clearance. The adjustment structure absorbs dispersion in dimensions of the throttle bore wall surface of the throttle body 101, dispersion in dimension of the outer periphery of the throttle valve, dispersion in assembling dimensions of the throttle shaft 102 and the throttle valve, and dispersion in assembling dimensions of the shaft 102 and the valve gear 106.

When the full-closing clearance is larger than a desired clearance, an amount of leakage air, when the throttle valve is in the full-closing position, increases. As a result, idling rotating speed may increase, and fuel consumption may increase. When the full-closing clearance is smaller than the desired clearance, the outer peripheral end surface of the throttle valve interferes with the throttle bore surface of the throttle body 101 in the vicinity of the full-closing position of the throttle valve. As a result, the throttle valve may cause seizure with the throttle body 101. In this case, the throttle valve may not normally perform opening and closing motions, and the amount of intake air cannot be properly controlled in the vicinity of idling opening degree.

Conventionally, an adjustment screw 109 is provided to project from the end surface of the fully-closing stopper 107 for adjustment of the full-closing position. The adjustment screw 109 is manually adjusted in length of an abutting part thereof, so that dimensions of respective parts and dispersion in assembly are absorbed. Thereby, a full-closing clearance is maintained at a desired clearance, so that an amount of leakage air is properly adjusted, when the throttle valve is in the full-closing position. As shown in FIGS. 13, 14, the adjustment screw 109 is screwed into the fully-closing stopper 107 of the gearbox 103 for defining full-closing opening degree. However, in this structure, the number of components increases, and adjusting the full-closing opening degree takes long, so that manufacturing cost increases. The adjustment screw 109 may be moved out of the adjustment. In this case, the dimension of the full-closing clearance may be changed from the desired full-closing clearance. When the adjustment screw 109 is sealed, the adjustment screw 109 may be restricted from being moved out of adjustment. However, manufacturing cost may increase due to the sealing work.

A magnetism detecting element may be used for a throttle sensor that detects the throttle opening degree. Specifically, a permanent magnet is fixed to the inner periphery of the valve gear 106, and a non-contact type magnetism detecting element is fixed to a sensor cover. The non-contact type magnetism detecting element generates electromotive force in response to a magnetic field generated by the permanent magnet. The sensor cover, which is separate from the throttle body 101, closes an opening side of the gearbox 103. In this structure, the rotating position of the permanent magnet relative to the magnetism detecting element may vary depending upon the adjusted position of the adjustment screw 109. Therefore, an adjustment structure needs to be constructed on the sensor cover, to which the magnetism detecting element is fixed, and an output adjusting function needs to be provided for the magnetism detecting element to adjust an output signal. Accordingly, adjusting both the adjustment structure and the output adjusting function takes long, and manufacturing cost may increase.

SUMMARY OF THE INVENTION

In view of the foregoing problems, it is an object of the present invention to provide an intake control device for an internal combustion engine, the intake control device having a structure, in which a throttle valve, a shaft, and a rotary driver can be assembled together under a predetermined assembling condition such as a mounting angle. It is another object of the present invention to provide an intake control device, in which a full-closing clearance can be adjusted without a screw for adjusting a full-closing position. It is another object of the present invention to provide an intake control device, in which working time needed for adjusting engine output and the full-closing position can be shortened.

According to the present invention, an intake control device for an internal combustion engine includes a throttle body, a throttle valve, a shaft, and a rotary driver. The throttle body defines a throttle bore, which is substantially circular-shaped in cross section, through which intake air flows. The throttle valve is rotatably assembled in the throttle bore. The throttle valve is in a shape corresponding to the cross section of the throttle bore. The shaft rotates integrally with the throttle valve. The rotary driver is connected with one axial end of the shaft to change the rotation angle of the throttle valve via the shaft. The rotary driver defines a hole, to which the one axial end of the shaft fits in a state of defining a clearance therebetween. The rotary driver defines a fitting recess that is dented radially outward from the inner wall surface of the hole. The one axial end of the shaft includes a coupling that is crimped to the rotary driver in a state of fitting to the hole. The coupling is provided with a fitting projection that enters into the fitting recess in a state, in which the coupling at least partially causes plastic deformation when the coupling is crimped to the rotary driver.

A method for manufacturing an intake control device, which has a throttle body rotatably receiving a throttle valve, includes following processes. A coupling, which is provided to one axial end of the shaft, is fitted into a hole formed in a rotary driver while defining a clearance therebetween. An abutting part, which is formed on the rotary driver rotatable integrally with a throttle valve connected with the shaft, is abutted against a latch part, which is provided to a throttle body. The coupling of the shaft is rotated in the hole formed in the rotary driver to put the throttle valve in a full-closing position while the abutting part abuts against the latch part, to adjust a full-closing clearance between an outer periphery of the throttle valve and a bore wall surface of the throttle body. The coupling is crimped to be fixed to the rotary driver in the full-closing position.

The throttle valve and the shaft are regulated in rotation angle using a jig, such that a direction, in which a bit fitting groove is formed in the shaft, is oriented to be substantially the same as an axial direction of an average flow of intake air flowing through a throttle bore formed in the throttle body, when the full-closing clearance is adjusted.

A fitting projection is formed to enter into a fitting recess formed in the rotary driver by crimping the coupling to the rotary driver.

Thereby, the throttle valve, the shaft, and the rotary driver are assembled under a predetermined assembling condition, in which a predetermined full-closing clearance can be obtained.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

[First Embodiment]

Figure 1:
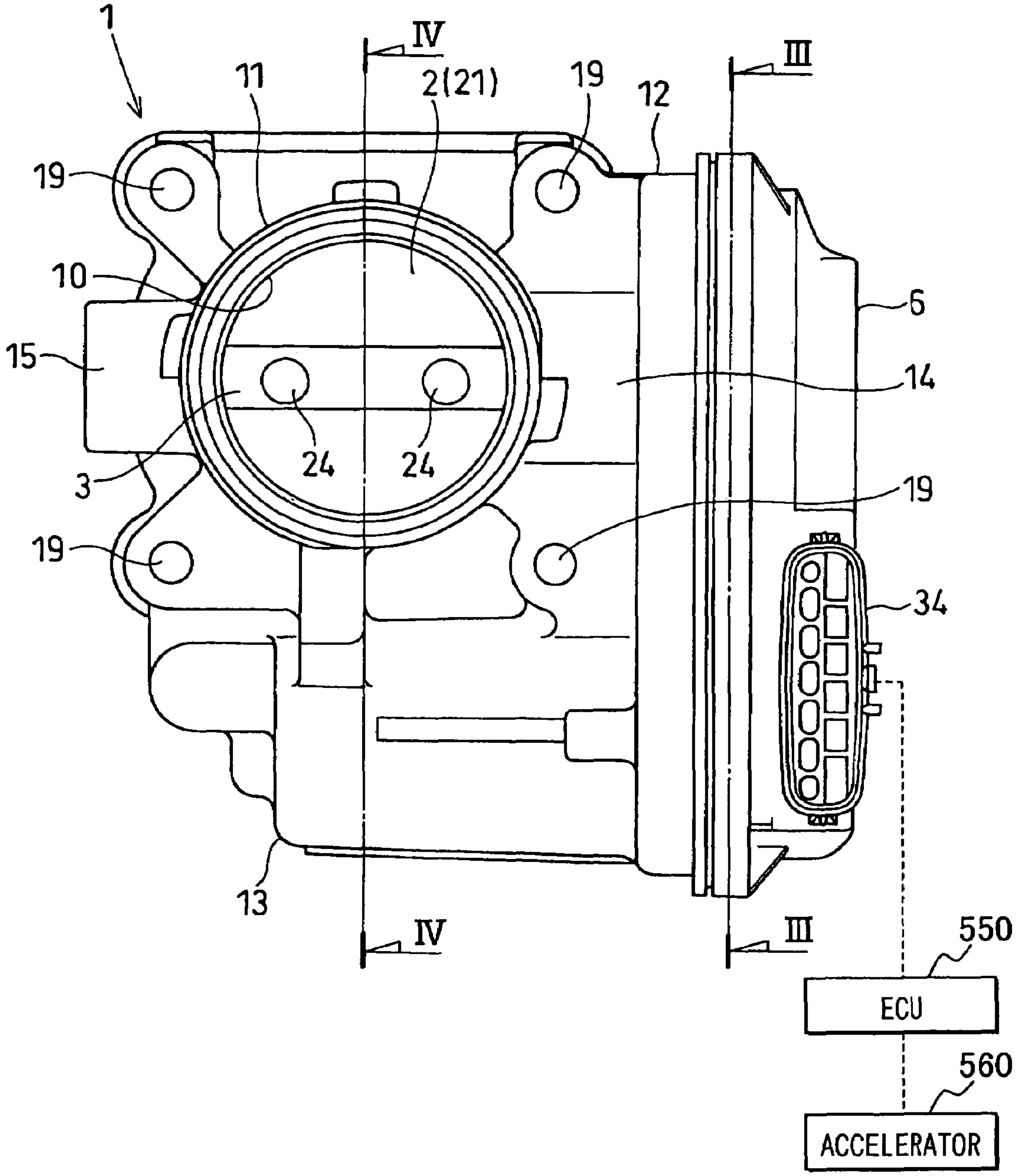
FIG. 1 is a front view showing a throttle control device for an internal combustion engine according to a first embodiment of the present invention.
Figure 2:
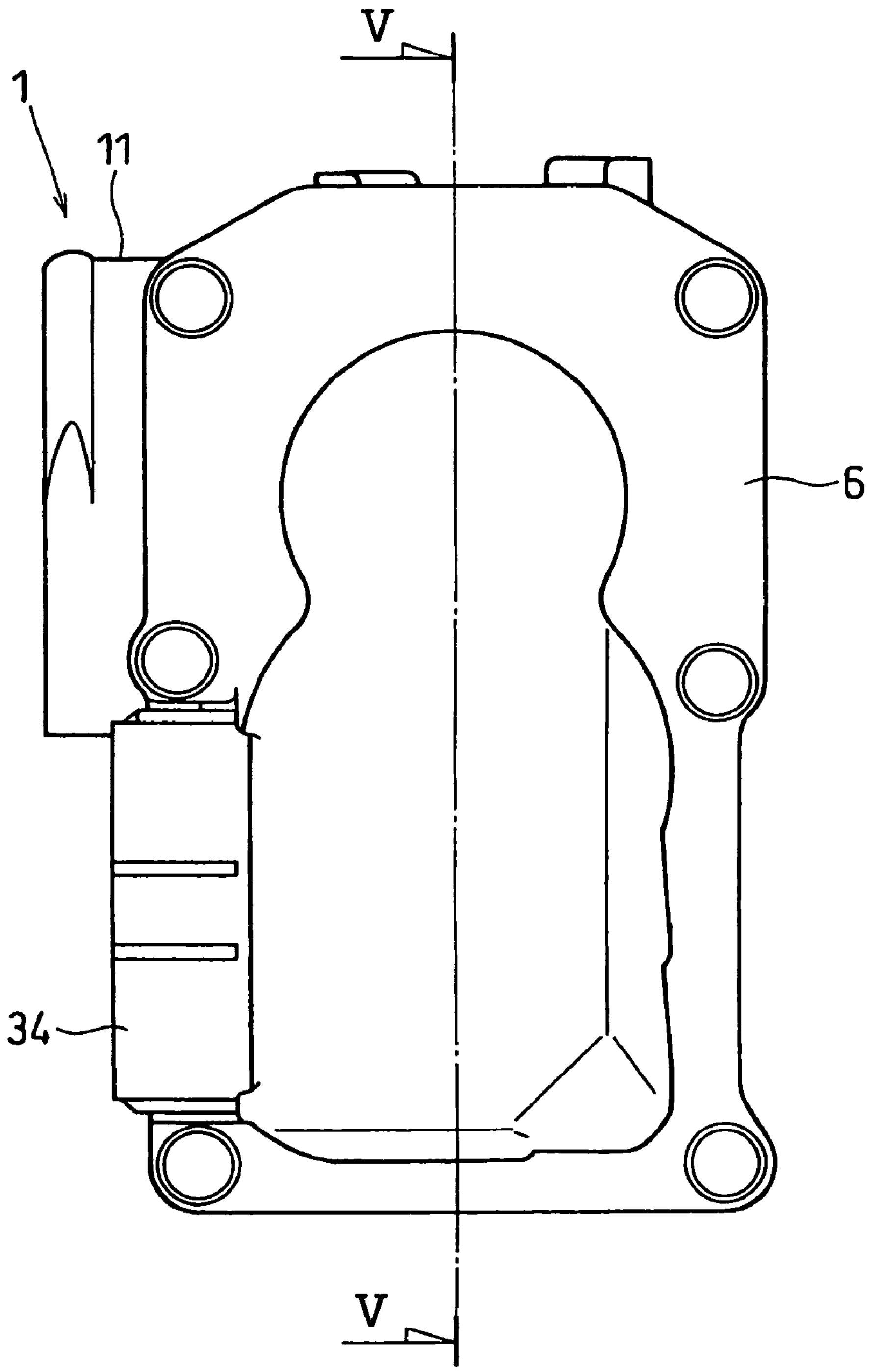
FIG. 2 is a side view showing the throttle control device according to the first embodiment.
Figure 3:
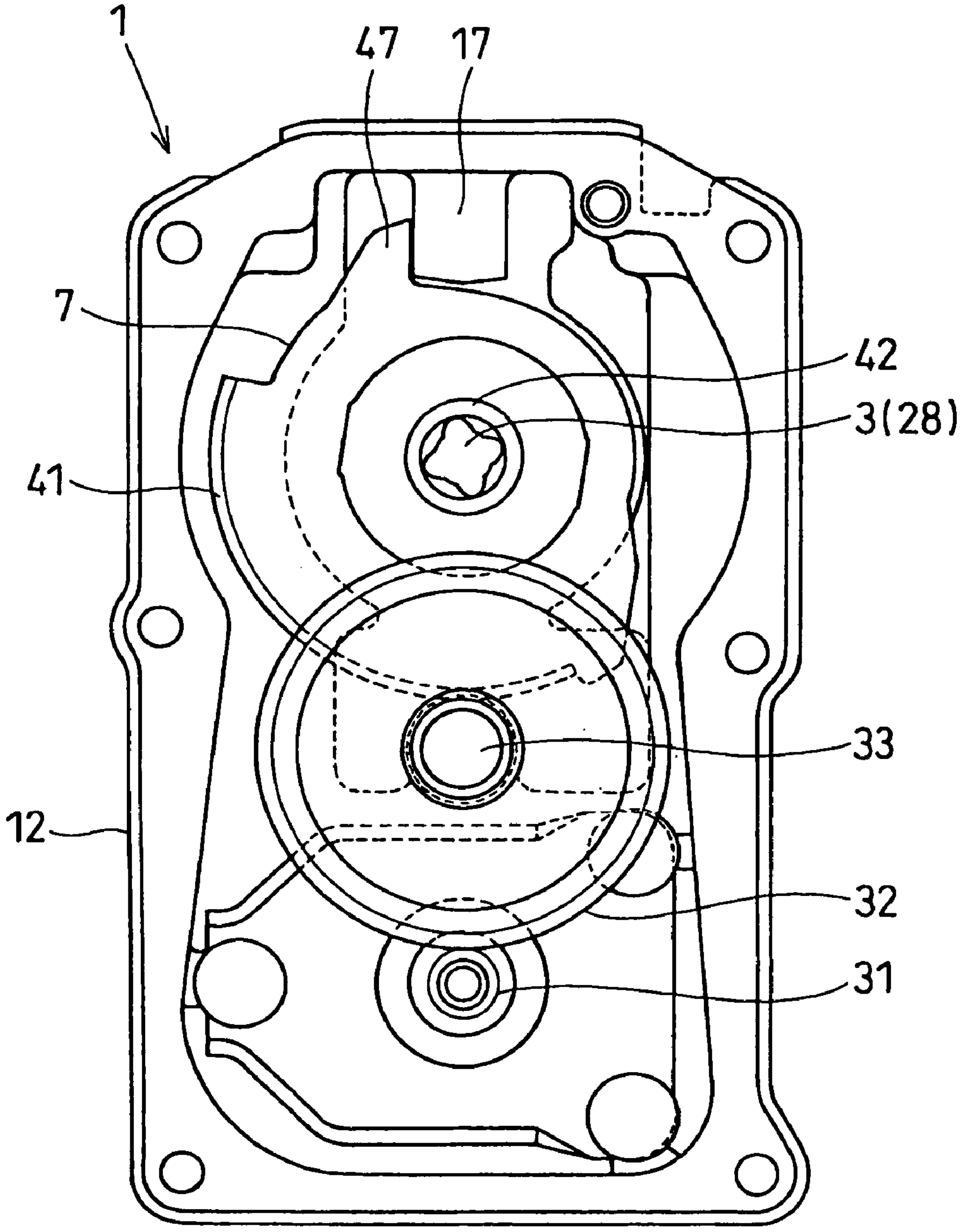
FIG. 3 is a cross sectional view taken along the line III—III in FIG. 1 according to the first embodiment.

A throttle control device (intake air control device) changes an amount of intake air flowing into respective cylinders (combustion chambers) of the internal combustion engine such as a multi-cylinder gasoline engine, in accordance with an accelerator position (an accelerator manipulated variable) to control engine rotation speed or engine torque. The throttle control device is an electronic control type throttle control device, in this embodiment.

As shown in FIGS. 1 to 7, the throttle control device includes a throttle body 1, a throttle valve 2, a throttle shaft 3, a motor 4, a coil spring 5, and an ECU (engine control unit) 550. The throttle body 1 has an intake passage that is communicated to respective cylinders of an engine 500. The throttle valve 2 controls an amount of intake air flowing through the intake passage. The throttle shaft 3 rotates together with the throttle valve 2. The motor 4 drives the throttle valve 2 in an opening direction and/or a closing direction. The coil spring 5 biases the throttle valve 2 in the closing direction. The ECU 550 controls an angular position, i.e., a throttle opening degree of the throttle valve 2 in accordance with an accelerator position.

The throttle body 1 includes a housing that rotatably holds the throttle valve 2. The throttle body 1 is clamped and fixed to the upstream end of an intake manifold of the engine 500 via fasteners (not shown) such as bolts and screws. A sensor cover 6 is assembled to an outer wall of the throttle body 1. The throttle body 1 is formed of a resinous material to integrally mold a circular-tube shaped throttle bore wall portion 11, a container-shaped gearbox 12, which rotatably accommodates a reduction gear, a cylindrical motor housing 13, which accommodates and holds the motor 4, and the like.

The bore wall portion 11 of the throttle body 1 has a circular-tube shaped body that forms a throttle bore (intake passage) 9, which is circular in cross section. Intake air flows toward the respective cylinders of the engine 500 through the throttle bore 9. The throttle body 1 is airtightly connected to the downstream end of an air cleaner (not shown) for filtering intake air. The bore wall portion 11 has the inner diameter that is substantially the same as the inner diameter of the downstream end of the air cleaner in the flow direction of intake air. The intake manifold is airtightly connected to the downstream end of the bore wall portion 11. Alternatively, a surge tank may be interposed between the bore wall portion 11 and the intake manifold for suppressing intake pulsation. The throttle valve 2 and the throttle shaft 3 are rotatably assembled into the throttle bore 9.

The bore wall portion 11 of the throttle body 1 has substantially cylindrical first and second valve bearing portions 14, 15, which rotatably support both ends of the throttle shaft 3. A plug (not shown) is provided to an end of an opening of the second valve bearing portion 15 to close the opening. The first valve bearing portion 14 is integrally formed with the bore wall portion 11 to project rightward in FIG. 5 from the outer wall surface of the bore wall portion 11. The first valve bearing portion 14 has the outer periphery that forms a spring inner periphery guide 16 that holds the inner peripheral side of the coil spring 5. The left end of the spring inner periphery guide 16 in FIG. 5 has a concave body-side spring hook (not shown), to which the other end of the coil spring 5 latches.

The gearbox 12 of the throttle body 1 is formed integral with the outer wall of the bore wall portion 11. The gearbox 12 is made of the resin material, which is the same as that of the bore wall portion 11 to be in a predetermined shape. The gearbox 12 defines a gear chamber that rotatably accommodates the reduction gear. As referred to FIG. 3, a block-shaped (protruding) fully-closing stopper (latch) 17 is integrally formed centrally with the upper end of the gearbox 12 to project downward from the inner wall surface of the gearbox 12. The fully-closing stopper (latch) 17 restricts a rotating motion of the throttle valve 2 in the closing direction at the full-closing position of the throttle valve 2. The fully-closing stopper 17 has an abutting surface on the left end surface in FIG. 3. The abutting surface of the fully-closing stopper 17 is arranged in opposition to an abutting surface of a fully-closing stopper part (abutting part) of a valve gear 7, when the throttle valve 2 is in a full-closing position. A block-shaped (protruding) fully-opening stopper may be formed integrally with the inner wall surface of the gearbox 12 to restrict a rotating motion of the throttle valve 2 in the opening direction at a full-opening position of the throttle valve 2.

Figure 5:
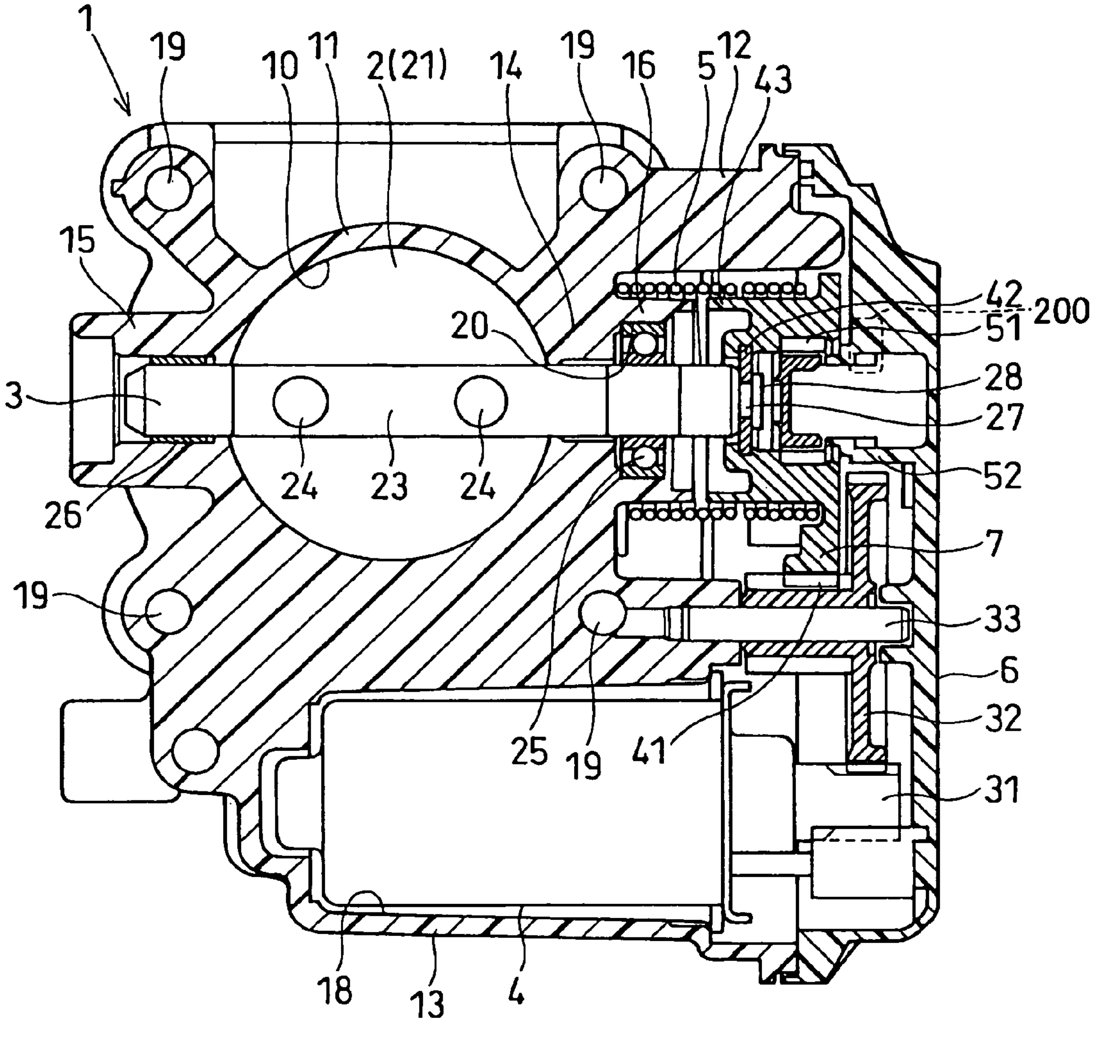
FIG. 5 is a cross sectional view taken along the line V—V in FIG. 2 according to the first embodiment.

As referred to FIG. 5, the motor housing 13 has a circular-shaped motor accommodating hole 18 that accommodates and holds the motor 4 therein. The motor housing 13 is made of the resin material, which is the same as that of the bore wall portion 11, to be substantially circular-shaped. The motor housing 13 is arranged downwardly relative to the container-shaped gearbox 12 in FIG. 5. The container-shaped gearbox 12 rotatably accommodates the reduction gear. The central axis of the motor accommodating hole 18 of the motor housing 13 is set to be in parallel with the axial direction of the throttle shaft 3 along the rotation center of the throttle valve 2. The central axis of the motor accommodating hole 18 is set to be substantially perpendicular to the axial direction of an average flow of intake air flowing through the throttle bore (intake passage) 9. Fasteners such as bolts and screws are inserted through insertion holes 19 to clamp and fix the downstream end of the throttle body 1 to the upstream end of the intake manifold.

The throttle valve 2 includes a butterfly rotary valve (butterfly valve) accommodated in the throttle bore 9 of the throttle body 1 such that the butterfly valve is capable of opening and closing the throttle bore 9. The throttle valve 2 has the rotation axis in a direction substantially perpendicular to the axial direction of the average flow of intake air flowing through the throttle bore (intake passage) 9. The throttle valve 2 includes a disk-shaped part 21 corresponding to a cross sectional shape of the throttle bore 9. An amount of intake air drawn into respective cylinders of the engine is adjusted by changing the rotation angle (valve angle, valve opening degree) of the throttle valve 2 in a rotative range. The rotative range is between a full-closing position and a full-opening position of the throttle valve 2. In the full-closing position, a clearance (full-closing clearance) between the outer periphery (outer peripheral end surface) 22 of the disk-shaped part 21 and a throttle bore wall surface (bore inner surface) 10 of the throttle body 1 is made minimum, so that the amount of intake air becomes minimum. In the full-opening position, a clearance between the outer peripheral end surface 22 of the disk-shaped part 21 and the bore inner surface 10 of the throttle body 1 is made maximum, so that the amount of intake air becomes maximum. The throttle valve 2 is clamped and fixed to a valve holding part 23 of the throttle shaft 3 using fasteners 24 such as screws in a state of being inserted through a valve insertion hole (not shown) formed in the valve holding part 23 of the throttle shaft 3.

The throttle shaft 3 is made of a non-magnetic material such as a non-magnetic metal material, or a metallic material such as brass, stainless steel to be substantially in columnar shape. The throttle shaft 3 includes the valve holding part 23 that holds and fixes thereto the disk-shaped part 21 of the throttle valve 2. The one end of the valve holding part 23 of the throttle shaft 3 rightward in FIG. 5 is rotatably supported on the inner periphery of a first shaft insertion hole of the first valve bearing portion 14 of the throttle body 1 via a ball bearing 25. The ball bearing 25 is latched on an outer wall surface, i.e., a bottom wall surface of the gearbox 12 of an annular recess 20 of the throttle body 1. The other end side of the throttle shaft 3 of the valve holding part 23 leftward in FIG. 5 is rotatably supported on the inner periphery of a second shaft insertion hole of the second valve bearing portion 15 of the throttle body 1 via a dry bearing 26.

The one axial end of the throttle shaft 3 rightward FIG. 5 has a columnar-shaped coupling 27 to be crimped and fixed to the inner periphery of the valve gear 7. As referred to FIG. 7, fitting projections 29 are provided to the coupling 27. Specifically, the coupling 27 is crimped and fixed in the inner periphery of the valve gear 7, so that the coupling 27 partially undergoes plastic deformation and the fitting projections 29 are formed to enter into fitting recesses of the valve gear 7. Thereby, relative rotating movement is restricted between the throttle shaft 3 and the valve gear 7. Owing to plastic deformation of a part of the coupling 27 when the inner periphery of the valve gear 7 is crimped and fixed, a collar part 28 is made larger in diameter than the outer diameter of the coupling 27, so that the throttle shaft 3 is restricted from axially moving relative to the valve gear 7. Thus, the throttle shaft 3 is restricted from being detached from the valve gear 7.

A power unit rotationally drives the throttle valve 2 in the opening direction and/or in the closing direction. The power unit is constructed of the motor 4 and a power transmission (reduction gear) that transmits a rotational torque of the motor 4 to the throttle valve 2 via the throttle shaft 3. The motor 4 includes an electric actuator (drive source) electrically connected to electric terminals embedded in the sensor cover 6. When the actuator is energized, a motor shaft (not shown) is rotated in a forward direction or in a backward direction. The reduction gear includes a pinion gear 31, an intermediate reduction gear 32, and the valve gear 7 to reduce the rotating speed of the motor 4 to a predetermined reduction ratio. The pinion gear 31 is fixed to the outer periphery of the shaft of the motor 4. The intermediate reduction gear 32 engages with the pinion gear 31. The valve gear 7 engages with the intermediate reduction gear 32. The intermediate reduction gear 32 is rotatably fitted onto the outer periphery of a support shaft 33 that defines the rotation center. The intermediate reduction gear 32 includes a large-diameter gear engaging with the pinion gear 31, and a small-diameter gear engaging with the valve gear 7.

The sensor cover 6 is formed of a resin material in a predetermined shape such that the sensor cover 6 is electrically insulative between terminals of a rotation angular sensor, and is electrically insulative between the electric terminals to the motor 4. The sensor cover 6 includes a fitted part that is fitted onto a fitting part provided to the opening side of the gearbox 12 of the throttle body 1. The sensor cover 6 is assembled to the opening side end of the gearbox 12 by means of rivets, screws, clips, welding, adhesion, or the like. The sensor cover 6 is integrally formed with a male connector (cylindrical connector shell, cylindrical connector receptor) 34, into which a female connector (not shown) is inserted.

The valve gear 7, which is one of the components of the reduction gear, is a rotary driver that is integrally formed of a resin material to be in a predetermined substantially annular shape. Components such as the throttle body 1 and the valve gear 7 are integrally molded of a resin material such as thermally stable thermoplastic resin, for example, PPS (polyphenylene sulphide), PA (polyamide resin), PP (polypropylene), or PEI (polyetherimide). Components such as the throttle body 1, the valve gear 7 are integrally molded of a resin material such as resin based composite materials, for example, polybutylene terephthalate containing 30% of glass fiber (PBTG30). The resin material is obtained by mixing a filling material such as glass fiber, carbon fiber, aramid fiber, or boron fiber into a resin material such as molten thermoplastic resin, which is heated to be in a molten state.

A gear part (teeth) 41 is formed integrally with the outer periphery of the valve gear 7 to engage with the small-diameter gear of the intermediate reduction gear 32. A metallic member (fitted part) 42, which is an annular plate, is insert-molded in the inner periphery of the valve gear 7. The metallic member 42 is to be crimped and fixed to one axial end of the throttle shaft 3. The valve gear 7 has a body side surface (bore wall side surface), which is formed integrally with a cylindrical outer periphery that projects from the body side surface leftward in FIG. 5. The cylindrical outer periphery serves as a spring inner-periphery guide 43 that holds a coil inner-diameter side of the coil spring 5. The spring inner-periphery guide 43 has a concave-shaped gear-side spring hook (not shown) on the right end in FIG. 5 to latch one end of the coil spring 5.

Figure 6:
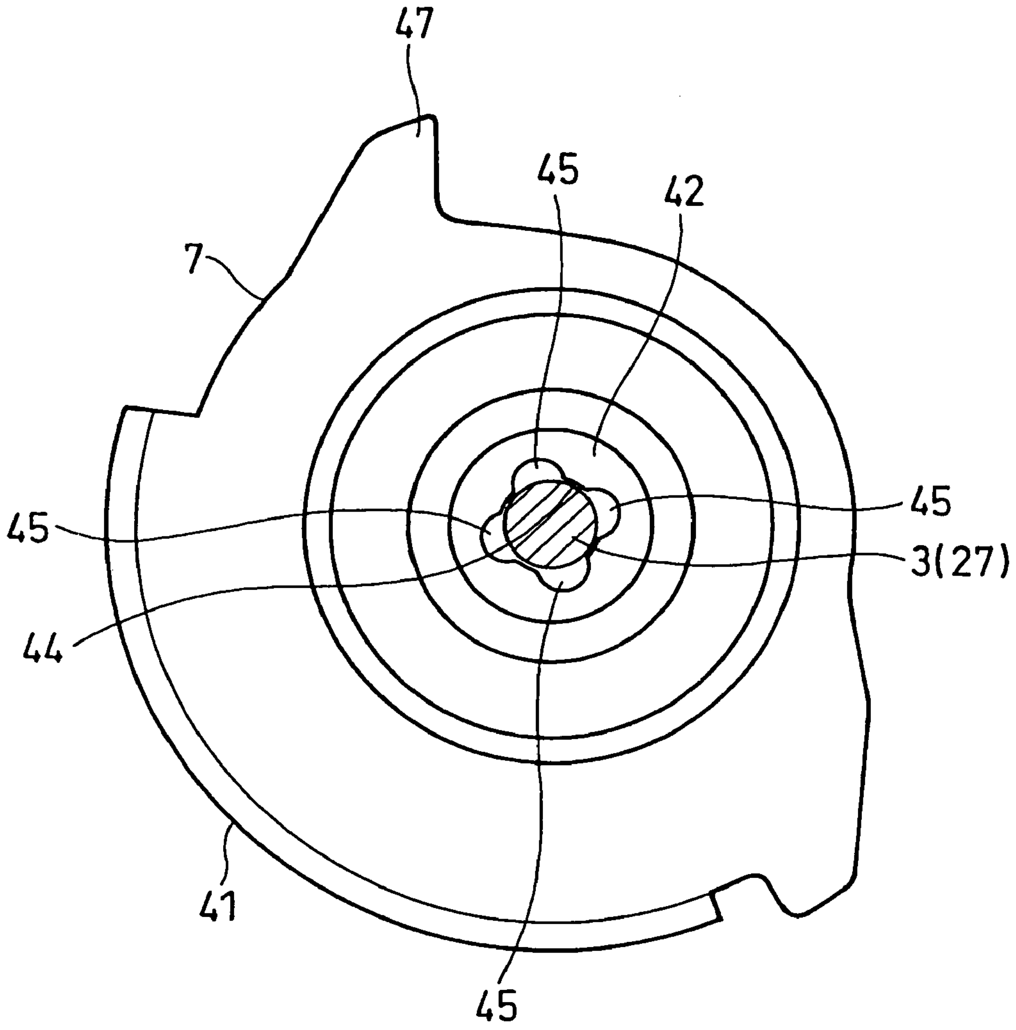
FIG. 6 is a front view showing a throttle shaft and a valve gear that are not fixed to each other, according to the first embodiment.

As referred to FIG. 6, the inner peripheral part of the metallic member 42 has a substantially circular-shaped fitted hole 44, into which the coupling 27 provided to one axial end of the throttle shaft 3 can be fitted with a clearance, i.e., can be clearance-fitted. Multiple fitting recesses 45 are formed in the fitted hole 44 such that the hole wall surface of the fitted hole 44, i.e., the inner peripheral surface of the metallic member 42 is dented radially outward. The fitting recesses 45 may include substantially semi-circular shape through-holes that extend through both end surfaces of the metallic member 42 to communicate therebetween. Alternatively, fitting recesses 45 may include bottomed grooves that open in one end surface, i.e., the outer wall surface of the metallic member 42 and close in the other end surface, i.e., the body-side wall surface of the metallic member 42. The coupling 27 of the throttle shaft 3, which projects outward from the end surface of the metallic member 42, is crimped using a tool, so that the coupling 27 is at least partially subjected to plastic deformation and the fitting projections 29 of the coupling 27 at least partially enter into the fitting recesses 45. Thereby, relative rotating movements of the throttle shaft 3 and the valve gear 7 are restricted.

A block-shaped, i.e., protruding full-closing stopper part (abutting part) 47 is formed integrally with the outer periphery of the valve gear 7. The full-closing stopper part 47 serves as a latched part, which is latched on the fully-closing stopper (latch part) 17 formed integrally with the inner periphery of the gearbox 12 when the throttle valve 2 is closed in the full-closing position. A right end surface of the full-closing stopper part 47 in FIG. 6 is an abutting surface that abuts directly against the fully-closing stopper 17 of the throttle body 1 when the throttle valve 2 is in the full-closing position.

The ECU 550 is connected with an accelerator position sensor (not shown) that converts an accelerator position, i.e., stepped amount of an accelerator pedal 560 into an electric signal (accelerator position signal). The accelerator position sensor outputs the accelerator position signal to the ECU 550. The throttle control device includes a rotation angular sensor (throttle position sensor) that converts the rotation angle (throttle opening degree) of the throttle valve 2 into an electric signal (throttle opening signal) and outputs the throttle opening signal to the ECU 550. The ECU 550 conducts the feedback control by proportional-plus-integral-plus-derivative control (PID control) on the motor 4, so that a deviation between the throttle opening signal from the rotation angular sensor and the accelerator position signal from the accelerator position sensor decreases.

The rotation angular sensor is a throttle sensor that detects the throttle opening degree (throttle position) corresponding to the rotation angle (valve angle) of the throttle valve 2. The rotation angular sensor includes a split type permanent magnet 51, a split type yoke (a magnetic body: not shown), and a non-contact type magnetism detecting element (not shown). The split type permanent magnet 51 rotates corresponding to rotation of the throttle valve 2. The split type yoke is magnetized by the magnet 51. The non-contact type magnetism detecting element outputs a signal conformed to a density of magnetic flux, which makes interlinkage relative to each other. The magnet 51 and the yoke are fixed together on the inner periphery of the valve gear 7 using adhesive or the like. The magnetism detecting element is constructed of a Hall element, a Hall IC, a magnetoresistive element, or the like. The magnetism detecting element is fixed to a sensor mount part 52 of the sensor cover 6 to be opposed to the inner peripheral surface of the yoke.

Next, a method for assembling the throttle control device in this embodiment is described with reference to FIGS. 1 to 7.

First, the dry bearing 26 is press fitted onto the inner periphery of the second shaft insertion hole of the second valve bearing portion 15 of the throttle body 1, and the ball bearing 25 is press fitted onto the outer periphery of the one axial end of the valve holding part 23 of the throttle shaft 3. Subsequently, the throttle shaft 3 is inserted into the first and second shaft insertion holes from axially outward of the first shaft insertion hole of the first valve bearing portion 14 of the throttle body 1, so that the valve holding part 23 of the throttle shaft 3 is arranged in the throttle bore (intake passage) 9. Thereby, one axial end of the valve holding part 23 of the throttle shaft 3 is rotatably supported in the first valve bearing portion 14 via the ball bearing 25, and the other axial end of the valve holding part 23 is rotatably supported in the second valve bearing portion 15 via the dry bearing 26. The ball bearing 25, which is press fitted onto the outer periphery of the throttle shaft 3, is latched on the wall surface of the annular recess 20 of the throttle body 1, so that the throttle shaft 3 is positioned axially relative to the throttle body 1.

Subsequently, the substantially disk-shaped throttle valve 2 is inserted into the valve insertion hole (not shown) formed in the valve holding part 23 of the throttle shaft 3 to be held, so that semi-circular disk portions of the disk-shaped part 21 of the throttle valve 2 project from the valve holding part 23. The fasteners 24 such as screws are used to clamp the throttle valve 2 to the valve holding part 23 of the throttle shaft 3. Thereby, the throttle valve 2 and the throttle shaft 3 are unified to be capable of integrally rotating. Subsequently, the coil spring 5 is mounted to the outer periphery of the spring inner periphery guide 16 provided to the outer periphery of the first valve bearing portion 14 of the throttle body 1. The other end of the coil spring 5 is hooked to the body side spring hook of the throttle body 1. Subsequently, the coil spring 5 is mounted to the outer periphery of the spring inner-periphery guide 43 provided to the outer periphery of the cylindrical part of the valve gear 7. The one end of the coil spring 5 is hooked on the gear side spring hook of the valve gear 7.

Subsequently, the inner periphery of the valve gear 7 is clearance-fitted onto the one axial end, i.e., the columnar-shaped coupling 27 of the throttle shaft 3 exposed into the gear chamber from the bottom wall surface of the gearbox 12 unified with the throttle body 1. That is, the fitted hole 44 formed in the metallic member (fitted part) 42, which is the annular plate insert-molded with the inner periphery of the valve gear 7, is clearance-fitted onto one axial end (the coupling 27) of the throttle shaft 3. At this time, as shown in FIG. 6, a small annular clearance is formed between the outer peripheral surface, i.e., the outer wall surface of one axial end (the coupling 27) of the throttle shaft 3 and the inner peripheral surface, i.e., the hole wall surface of the fitted hole 44 on the inner periphery of the valve gear 7. Thereby, relative rotating movements are enabled between the throttle valve 2 connected with the throttle shaft 3 and the valve gear 7.

Subsequently, the abutting surface of the block-shaped full-closing stopper part 47 formed on the outer periphery of the valve gear 7 is caused to mechanically touch, i.e., directly contact with the abutting surface of the block-shaped fully-closing stopper 17 provided to the inner periphery of the gearbox 12 of the throttle body 1. In this manner, the throttle shaft 3 is rotated in the fitted hole 44 on the inner periphery of the valve gear 7 to adjust a full-closing clearance while the full-closing stopper part 47 of the valve gear 7 abuts against the fully-closing stopper 17 of the throttle body 1. The work of adjusting the full-closing clearance is carried out by fine adjustment of relative rotation angles (mount angles) between the throttle valve 2 connected with the throttle shaft 3 and the valve gear 7. The fine adjustment is carried out, so that a predetermined clearance (full-closing clearance) is defined between the outer peripheral end surface 22 of the disk-shaped part 21 of the throttle valve 2 and the bore inner surface 10 of the throttle body 1, as shown by solid lines in FIG. 4. That is, the outer peripheral end surface 22 of the disk-shaped part 21 of the throttle valve 2 does not mechanically touch (directly make contact with) the bore inner surface 10 of the throttle body 1.

Figure 7:
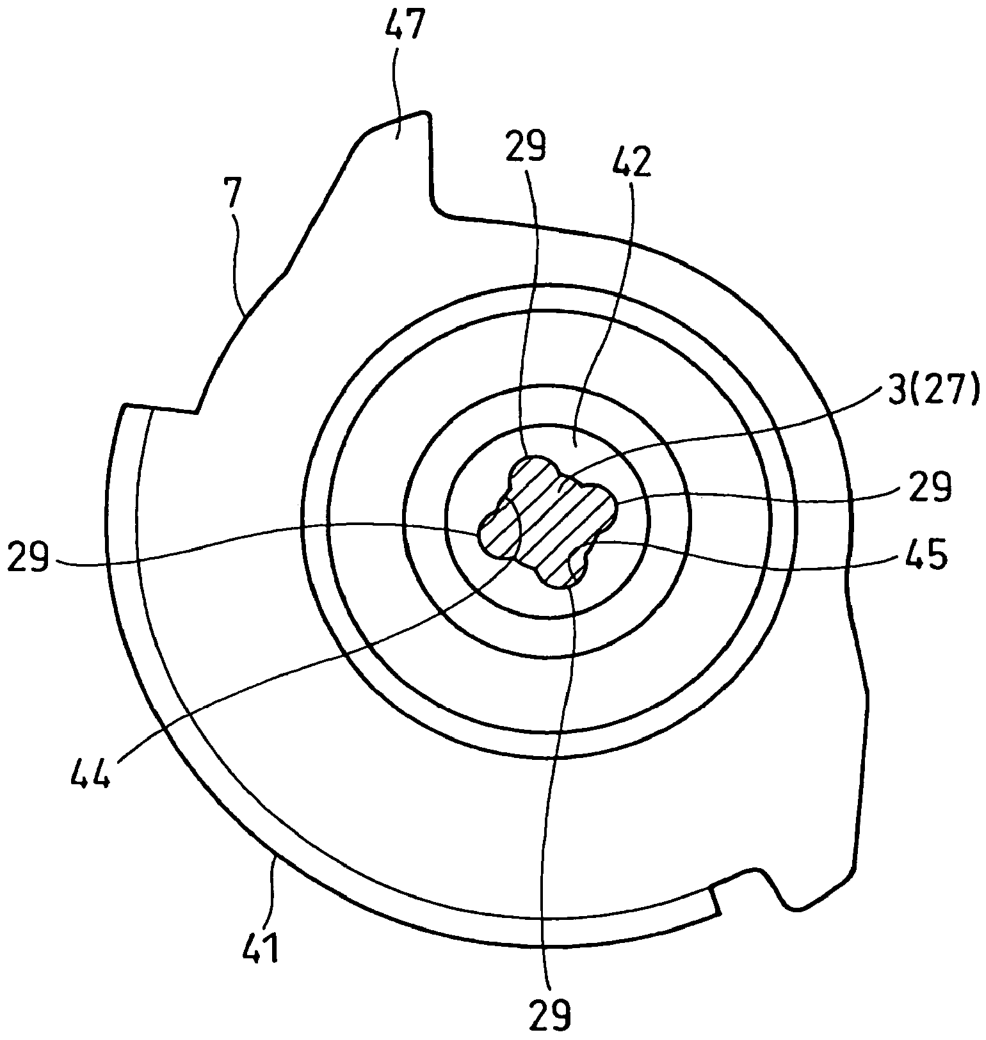
FIG. 7 is a front view showing the throttle shaft and the valve gear that are fixed to each other, according to the first embodiment.

Subsequently, after the adjustment of the full-closing clearance, the coupling 27 is partially subjected to plastic deformation by crimping the one axial end (the coupling 27) of the throttle shaft 3 projecting outward from the end surface of the metallic member 42 on the side of the inner periphery of the valve gear 7. Thereby, as shown in FIG. 7, a part, i.e., the fitting projections 29 of the coupling 27 enters into the fitting recesses 45. Thus, the metallic member 42 on the side of the inner periphery of the valve gear 7 is crimped and fixed to the one axial end (the coupling 27) of the throttle shaft 3. Thereby, relative rotation angle (mount angle) between the throttle valve 2 connected with the throttle shaft 3 and the valve gear 7 is restricted, and relative rotating movement between the throttle shaft 3 and the valve gear 7 is restricted. By the above assembling work, the throttle valve 2, the throttle shaft 3, the coil spring 5, and the valve gear 7 are assembled together with the throttle body 1.

Subsequently, the operation of the throttle control device in this embodiment is described with reference to FIGS. 1 to 7.

The driver steps on the accelerator pedal 560, and the accelerator position signal is input into the ECU 550 from the accelerator position sensor. The ECU 550 carries electric current to the motor 4, so that the motor shaft of the motor 4 is rotated to set the throttle valve 2 at a predetermined angle. Torque of the motor 4 is transmitted to the pinion gear 31, the intermediate reduction gear 32, and the valve gear 7. Thereby, the valve gear 7 rotates for a rotation angle corresponding to the stepped amount of the accelerator pedal 560 against the bias of the coil spring 5. The valve gear 7 rotates, so that the throttle shaft 3 rotates for the rotation angle, which is the same as that of the valve gear 7, and the throttle valve 2 is rotationally driven in the opening direction, i.e., fully opening direction from the full-closing position to the full-opening position. As a result, the intake passage is opened for a predetermined angle, so that the engine rotation speed is changed corresponding to the stepped amount of the accelerator pedal 560.

When the driver separates the foot from the accelerator pedal 560, the throttle valve 2, the throttle shaft 3, the valve gear 7 are returned to respective original positions, which are respective idling positions, i.e., the full-closing position of the throttle valve 2 by the bias of the coil spring 5. Alternatively, when the driver returns the accelerator pedal 560, the accelerator position signal (0%) is output from the accelerator position sensor, so that the ECU 550 may carry electric current to the motor 4 to reversely rotate the motor shaft of the motor 4, so that the throttle valve 2 is put at the opening degree at the time of full-closing. In this case, the throttle valve 2 can be rotationally driven in the fully closing direction by the motor 4.

Figure 4:
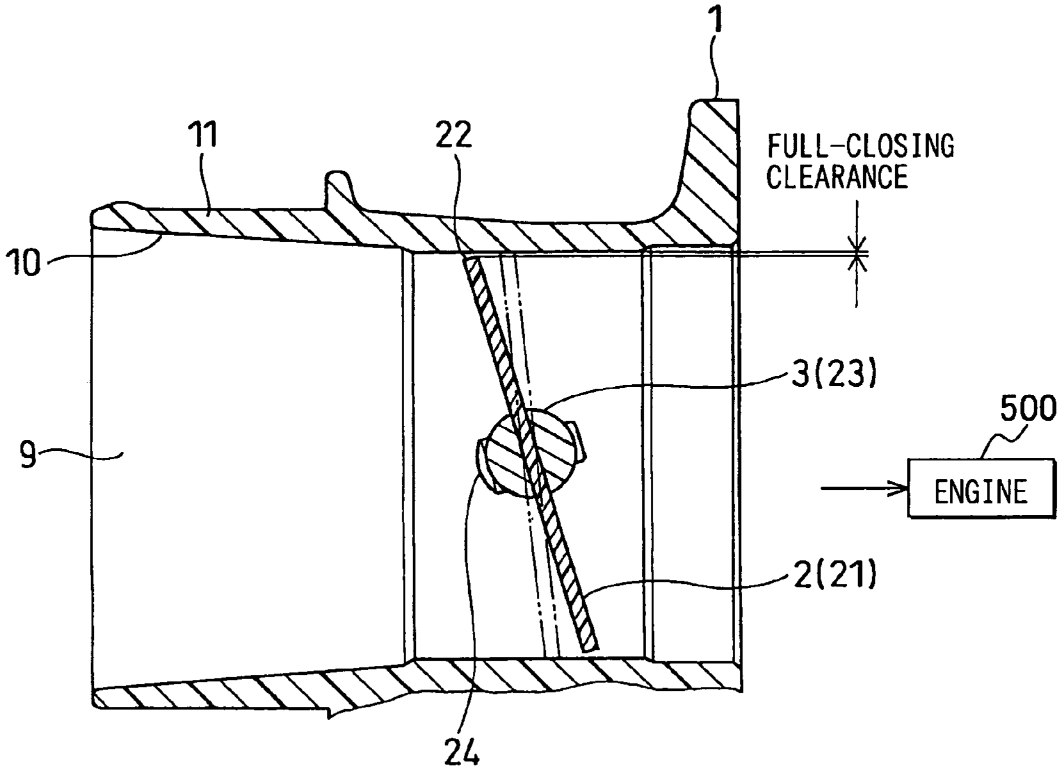
FIG. 4 is a cross sectional view taken along the line IV—IV in FIG. 1 according to the first embodiment.

When the accelerator pedal 560 is released, the throttle valve 2 is rotated in the fully closing direction by the bias of the coil spring 5 until the full-closing stopper part 47 provided to the valve gear 7 abuts against the fully-closing stopper 17 provided to the inner wall surface of the gearbox 12. The fully-closing stopper 17 restricts a further rotating motion of the throttle valve 2 in the fully closing direction, so that the throttle valve 2 is held at a predetermined full-closing position in the intake passage. The angular position of the throttle valve 2 is maintained, so that a predetermined clearance (full-closing clearance) is defined between the outer peripheral end surface 22 of the disk-shaped part 21 of the throttle valve 2 and the bore inner surface 10 of the throttle body 1, as shown in FIG. 4. Thereby, intake air is drawn into respective cylinders of the engine for a predetermined intake air quantity, i.e., the amount of leakage air at the time of full-closing, even when the throttle valve 2 is in the full-closing position at the time of idling. A solenoid valve (not shown) controls an amount of air bypassing the throttle valve 2, so that the engine rotation speed is set at a target idling rotating speed. Electric current carried to the motor 4 may be controlled to set the opening degree of the throttle valve 2 at a predetermined opening degree larger than that in the full-closing position. Thereby, the engine rotation speed can be controlled at a target idling rotating speed without using the solenoid valve that controls the amount of air bypassing the throttle valve 2.

As described above, the full-closing clearance can be finely adjusted in the throttle control device, even when an adjustment structure is needed to absorb dispersion in dimensions of the bore inner surface 10 of the throttle body 1, the outer periphery of the throttle valve 2, in assembling dimensions of the throttle shaft 3 and the throttle valve 2, and in assembling dimensions of the throttle shaft 3 and the valve gear 7. The clearance (full-closing clearance) defined between the bore inner surface 10 of the throttle body 1 and the outer peripheral end surface of the disk-shaped part 21 of the throttle valve 2 can be maintained at a dimension of a desired clearance. The circular-shaped fitted hole 44 is formed on the inner peripheral part of the valve gear 7, and the one axial end, i.e., the columnar-shaped coupling 27 of the throttle shaft 3 is fitted into the circular-shaped fitted hole 44 to be capable of relative rotation. The coupling 27 of the throttle shaft 3 is rotated in the fitted hole 44 in the state, in which the full-closing stopper part 47 provided to the valve gear 7 abuts against the fully-closing stopper 17 provided to the throttle body 1 to make the full-closing position, in which the clearance is made minimum. Thus, the fine adjustment can be performed. That is, the full-closing clearance can be finely adjusted although a adjustment screw for adjusting the full-closing clearance is reduced, so that the number of parts and manhour for assembly can be reduced to achieve cost reduction.

Figure 14:
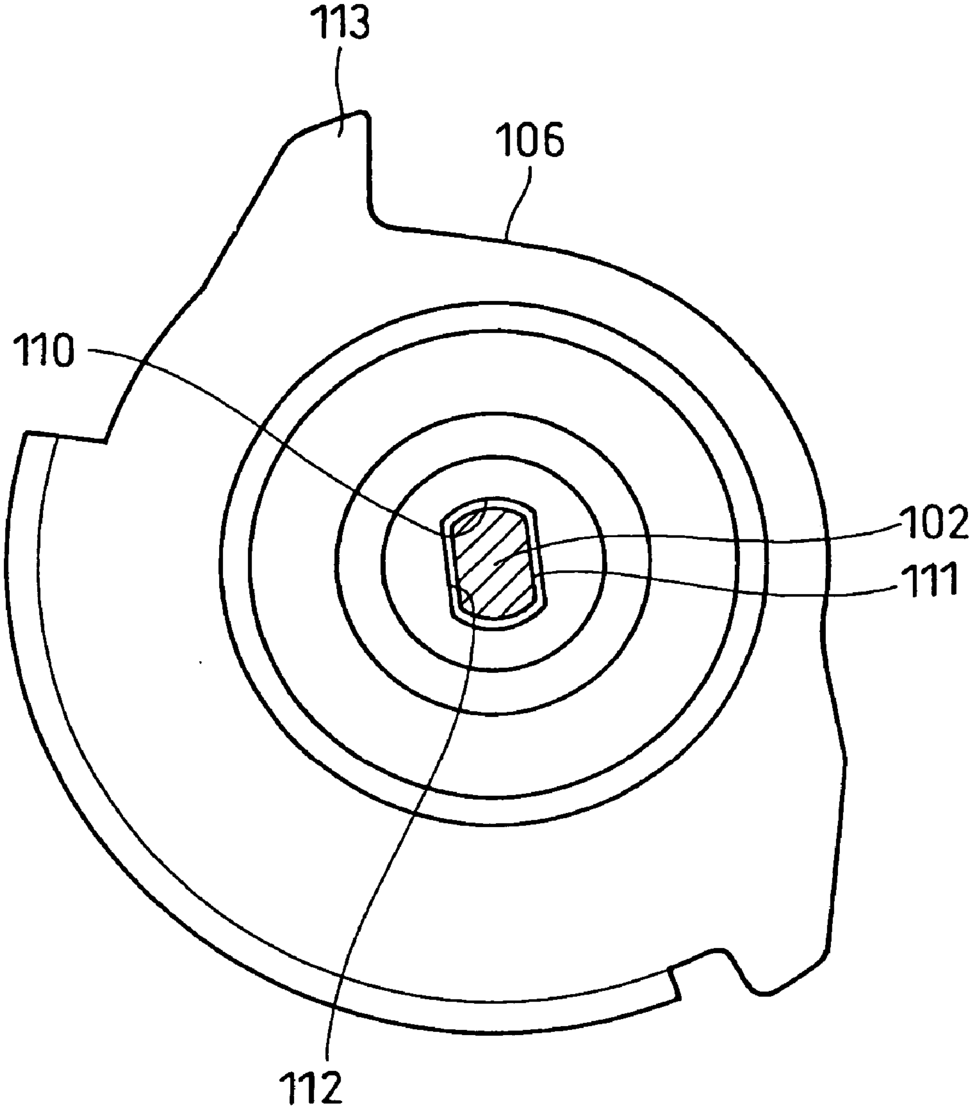
FIG. 14 PRIOR ART
FIG. 14 is a front view showing a throttle shaft and a valve gear according to the prior art.

The fitting recesses 45 are formed in the fitted hole 44 of the valve gear 7 to be dented radially outward from the hole wall surface thereof. The fitting projections 29 are provided to the one axial end, i.e., the coupling 27 of the throttle shaft 3 to enter into the fitting recesses 45 by plastic deformation of the part of the coupling 27, when the valve gear 7 is crimped and fixed to the coupling 27. As referred to FIG. 14, the flatted round portions 111, 112 prescribes the throttle shaft 3, the shaft 102, and the valve gear 106 at a predetermined relative angle, in the prior art. However, even when the flatted round portions 111, 112 are not provided in this embodiment, it is possible to prescribe the throttle valve 2, the throttle shaft 3, and the valve gear 7 at the predetermined relative angle. Besides, relative rotation can be restricted between the throttle shaft 3 and the valve gear 7. It is possible to assemble the throttle valve 2, the throttle shaft 3, and the valve gear 7 under an optional assembling condition (mount angle). The valve gear 7 can be assembled to the throttle shaft 3 under an optional assembling condition (mount angle). Thereby, it is possible to shorten time for the assembling work, by which the valve gear 7 is assembled to the one axial end, i.e., the coupling 27, of the throttle shaft 3 to correspond to the rotation angle of the throttle valve 2.

The full-closing clearance defined between the bore inner surface 10 of the throttle body 1 and the outer peripheral end surface 22 of the disk-shaped part 21 of the throttle valve 2, when the throttle valve 2 is in the full-closing position, becomes a predetermined clearance dimension. Thereby, it is possible to restrict the amount of leakage air at the time of idling. In view of the present state, in which an amount of a fuel such as gasoline used in the engine is controlled corresponding to the flow amount of intake air, restriction of the amount of the leakage air at the time of idling contributes to improvement in fuel consumption. With the throttle control device according to the embodiment, the throttle valve 2, the throttle shaft 3, and the valve gear 7 are assembled under a predetermined assembling condition such as a mount angle, by which a predetermined full-closing clearance can be obtained. Thereby, the magnet 51, the yoke, and the magnetism detecting element are assembled in a predetermined assembling condition such as facing positions, relative positions. Thereby, it is possible to heighten assembly accuracy of the magnetism detecting element with respect to the rotation angle of the throttle valve 2. The motor 4 is feedback controlled using PID control or PI control in the throttle control device, so that a deviation in opening degree between the throttle opening signal from the magnetism detecting element, which is constructed of the rotation angular sensor, and the accelerator position signal from the accelerator position sensor decreases.

Accordingly, unless the throttle opening signal from the magnetism detecting element and the actual rotation of the throttle valve 2 are caused to coincide with, i.e., conform to each other, the throttle opening degree corresponding to the accelerator position cannot be obtained, and an engine output, i.e., engine rotation speed corresponding to the accelerator position cannot be obtained. In this embodiment, the coupling 27 of the throttle shaft 3 is crimped to the inner periphery of the metallic member 42, after the throttle shaft 3 is rotated to adjust the full-closing clearance, while abutting the full-closing stopper part 47 of the valve gear 7 against the fully-closing stopper 17 of the throttle body 1. Thereby, the rotation angle, i.e., mount angle of the throttle valve 2 and the mount position of the magnetism detecting element are set in the predetermined assembling condition. Thus, it is possible to shorten or reduce time for the work of output adjustment, by which the throttle opening signal output from the magnetism detecting element is conformed to the rotation angle of the throttle valve 2. That is, it is possible to restrict the work of output adjustment to the necessity minimum. Furthermore, accuracy in assembling the magnetism detecting element relative to the rotation angle of the throttle valve 2 can be enhanced.

[Second Embodiment]

Figure 8A:
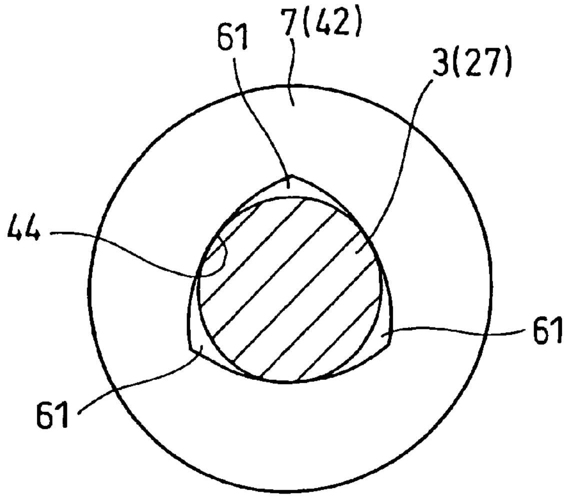
FIGS. 8A to 8D are front views showing throttle shafts and valve gears according to the second embodiment of the present invention.

As shown in FIG. 8A, a columnar-shaped coupling 27 is provided to the one axial end of the throttle shaft 3, and multiple fitting recesses 61 are formed to be dented radially outward from the hole wall surface of the circular-shaped fitted hole 44 formed in the metallic member 42 on the inner periphery of a valve gear 7. The fitting recesses 61 are substantially triangular-shaped through-holes or grooves.

In this structure, the coupling 27 is clearance-fitted into the fitted hole 44, so that the outer periphery of the coupling 27 and the inner periphery of the fitted hole 44 come into line contact with each other. Therefore, relative rotating movement between the throttle shaft 3 and the valve gear 7 are not restricted in the fit state prior to crimping and fixing the throttle shaft 3 and the valve gear 7. Besides, the full-closing clearance can be finely adjusted by rotating the throttle shaft 3 while abutting the full-closing stopper part 47 of the valve gear 7 against the fully-closing stopper 17 of the throttle body 1, similarly to the first embodiment.

In the joined state after crimping and fixing the throttle shaft 3 and the valve gear 7, that is, at the time of crimping and fixing the columnar-shaped coupling 27 of the throttle shaft 3 to the metallic member 42 of the valve gear 7, the coupling 27 partially undergoes plastic deformation to form multiple fitting projections (not shown), which enter into the multiple fitting recesses 61. Therefore, relative rotating movement between the throttle shaft 3 and the valve gear 7 are restricted, and the throttle valve 2, the throttle shaft 3, and the valve gear 7 are assembled under an optional assembling condition such as a mount angle.

Figure 8B:
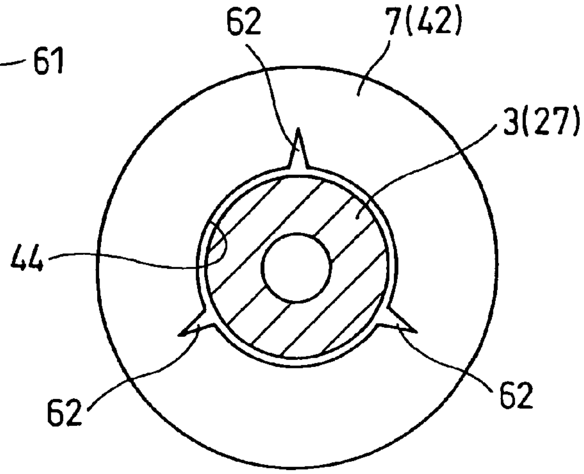
Figure 8C:
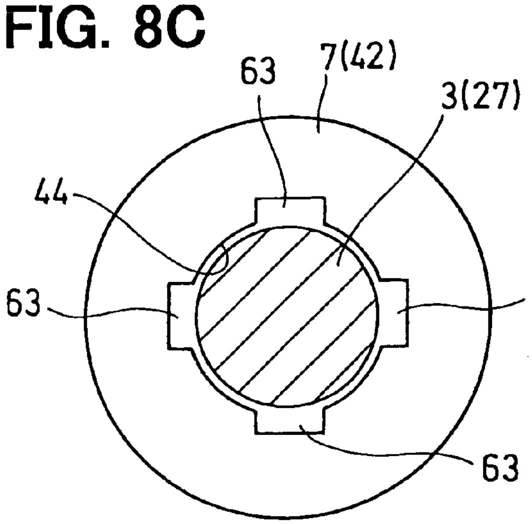

As shown in FIG. 8B, 8C, the columnar-shaped coupling 27 is provided to the one axial end of the throttle shaft 3, and multiple fitting recesses 62, 63 are formed to be dented radially outward from the hole wall surface of the circular-shaped fitted hole 44 formed in the metallic member 42 in the inner periphery of the valve gear 7. The fitting recesses 62 are triangular-shaped through-holes or grooves, and the fitting recesses 63 are rectangular-shaped through-holes or grooves.

In these structures, the coupling 27 is clearance fitted into the fitted hole 44, so that a predetermined annular clearance is defined between the outer periphery of the coupling 27 and the inner periphery of the fitted hole 44. Therefore, relative rotating movement between the throttle shaft 3 and the valve gear 7 are not restricted in the fit state prior to crimping and fixing the throttle shaft 3 and the valve gear 7. Besides, the full-closing clearance can be finely adjusted by rotating the throttle shaft 3 while abutting the full-closing stopper part 47 of the valve gear 7 against the fully-closing stopper 17 of the throttle body 1.

In the joined state after crimping and fixing the throttle shaft 3 and the valve gear 7, that is, at the time of crimping and fixing the columnar-shaped coupling 27 of the throttle shaft 3 to the metallic member 42 of the valve gear 7, the coupling 27 partially undergoes plastic deformation to form multiple fitting projections (not shown), which enter into the multiple fitting recesses 62, 63. Therefore, relative rotating movement between the throttle shaft 3 and the valve gear 7 are restricted, and the throttle valve 2, the throttle shaft 3, and the valve gear 7 are assembled under an optional assembling condition such as a mount angle.

Figure 8D:
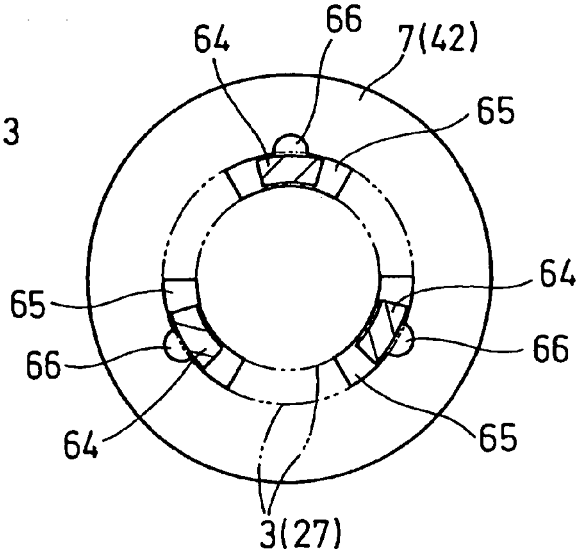
Figure 9:
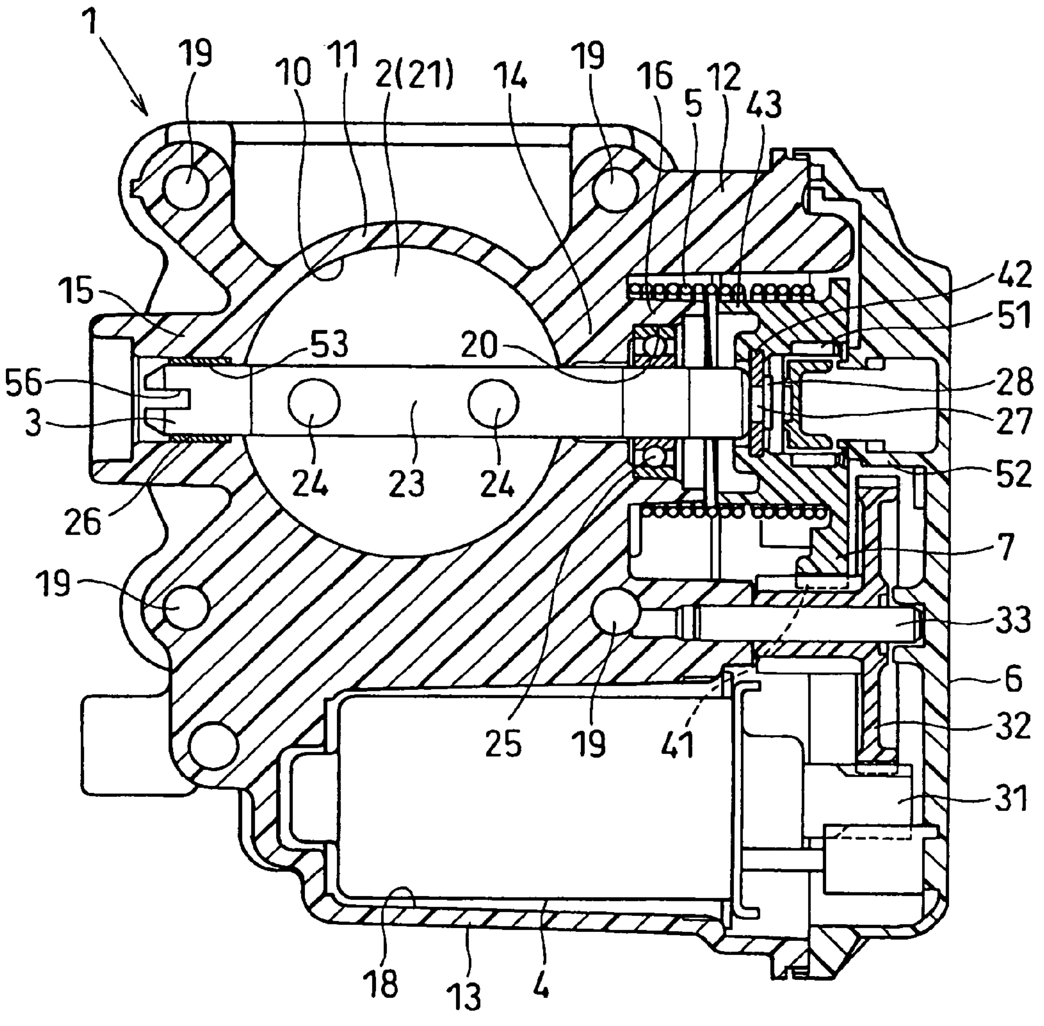
FIG. 9 is a cross sectional view showing a throttle control device for an internal combustion engine according to a third embodiment of the present invention.

As shown in FIG. 8D, multiple arcuate-shaped fitting projections (pawl-shaped portions) 64 are provided to project axially outward from the end surface of the columnar-shaped coupling 27, which is provided to the one axial end of the throttle shaft 3. Multiple fitting recesses 66 are formed to be dented radially outward from the radial hole wall surfaces of multiple arcuate-shaped fitted holes 65 provided in the metallic member 42 of the valve gear 7. The multiple fitting recesses 66 are semi-circular through-holes or grooves.

In this case, the respective arcuate-shaped fitting projections 64 are clearance fitted respectively into the arcuate-shaped fitted holes 65, so that predetermined arcuate-shaped clearances are defined between both circumferential sides of the arcuate-shaped fitting projections 64 and circumferential hole wall surfaces of the arcuate-shaped fitted holes 65. Thereby, predetermined clearances are defined among the inner periphery and the outer periphery of the arcuate-shaped fitting projections 64 and radial hole wall surfaces of the arcuate-shaped fitted holes 65. Accordingly, relative rotating movement between the throttle shaft 3 and the valve gear 7 is not restricted in the fit state prior to crimping and fixing the throttle shaft 3 and the valve gear 7. Besides, the full-closing clearance can be finely adjusted by rotating the throttle shaft 3 in the range of rotative motion restricted by the arcuate-shaped fitted holes 65, while abutting the full-closing stopper part 47 of the valve gear 7 against the fully-closing stopper 17 of the throttle body 1, similarly to the first embodiment.

In the joined state after crimping and fixing the throttle shaft 3 and the valve gear 7, that is, at the time of crimping and fixing the arcuate-shaped fitting projections 64 projecting from the end surface of the coupling 27 of the throttle shaft 3 to the metallic member 42 of the valve gear 7, the respective arcuate-shaped fitting projections 64 at least partially undergo plastic deformation to form multiple fitting projections (not shown), which enter into the multiple fitting recesses 66. Therefore, relative rotating movement between the throttle shaft 3 and the valve gear 7 is restricted, and the throttle valve 2, the throttle shaft 3, and the valve gear 7 are assembled under an optional assembling condition such as the mount angle.

[Third embodiment]

As shown in FIGS. 9, 10A to 10C, the bore wall portion 11 of the throttle body 1 is provided with the first and the second valve bearing portions 14, 15 that rotatably support both ends of the throttle shaft 3. The cylindrical bearing member (bearing) 26 is press fitted onto the inner periphery of the shaft insertion hole of at least one of the first and the second valve bearing portions 14, 15. The bearing 26 is a dry bearing, a slide bearing, a thrust bearing, or a bearing bush. The bearing 26 has a slide hole 53, which rotatably supports one axial end of the throttle shaft 3 on the side opposite to the valve gear 7 such that the throttle shaft 3 is slidable in the rotating direction. The bearing 26 is integrally formed of a sintered bearing material of excellent abrasion resistance to be in a predetermined substantially cylindrical shape.

The coupling 27 is provided to the one axial end of the throttle shaft 3 to be crimped and fixed to the inner periphery of the valve gear 7. The fitting projections 29 (FIG. 7) are provided to the coupling 27 in the same manner as in the first and second embodiments. When the metallic member 42 is subjected to be crimped and fixed to the inner periphery of the valve gear 7, the coupling 27 partially undergoes plastic deformation to enter into the fitting recesses 45 of the metallic member 42 to restrict relative rotating movement of the throttle shaft 3 and the valve gear 7. When the metallic member 42 is crimped and fixed to the inner periphery of the valve gear 7, the coupling 27 partially undergoes plastic deformation. Thereby, the collar part 28 is made larger in diameter than the outer diameter of the coupling 27 to restrict coming-off of the throttle shaft 3 from the valve gear 7, in the same manner as in the first and second embodiments. The other axial end surface of the throttle shaft 3, i.e., the end surface opposed to the side, in which the metallic member 42 is coupled to the inner periphery of the valve gear 7, has a bit fitting groove 56, into which a tip blade 55 of a fitting bit 54 of a jig is fitted. The bit fitting groove 56 has a substantially straight line-shaped minus groove.

In this embodiment, the tip blade 55 of the fitting bit 54 of the jig is fitted into the bit fitting groove 56 in the throttle shaft 3, which is unified with a throttle valve 2, to rotate the throttle shaft 3. Thereby, the full-closing clearance in the full-closing position described in the first embodiment is adjusted. Specifically, the flow amount of the leakage air in full-closing position, when the valve is in the full-closing position at the time of idling, is adjusted. The jig is used to regulate, i.e., constrain the rotation angle of the throttle valve 2 and the throttle shaft 3 in the full-closing position. Thereby, the direction, in which the bit fitting groove 56 is formed in the throttle shaft 3, and the axial direction of the throttle bore 9 are oriented in substantially the same direction. Here, the average flow of intake air flowing in the throttle bore 9 passes along the axial direction of the throttle bore 9. The jig is rotationally driven by a power unit, or rotated by a manual operation.

Figure 10A:
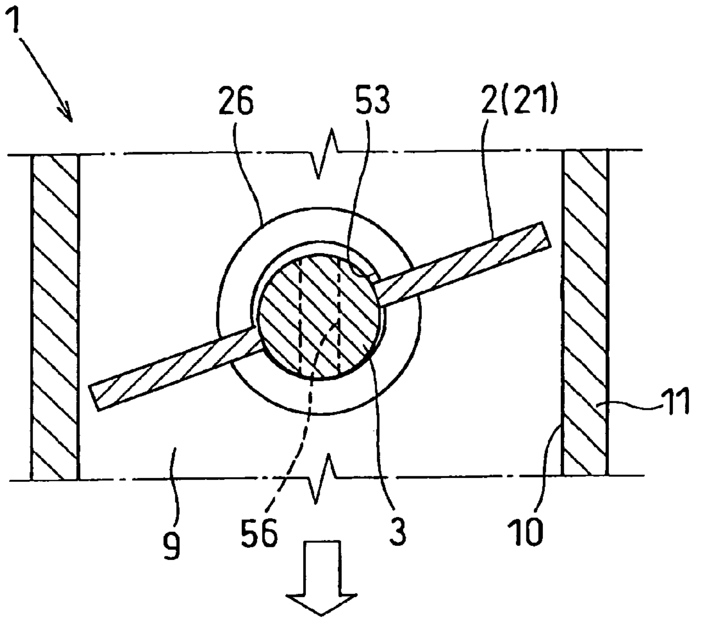
FIGS. 10A, 10B, 10C are cross sectional side views showing the throttle valve in the throttle control device according to a third embodiment.
Figure 10B:
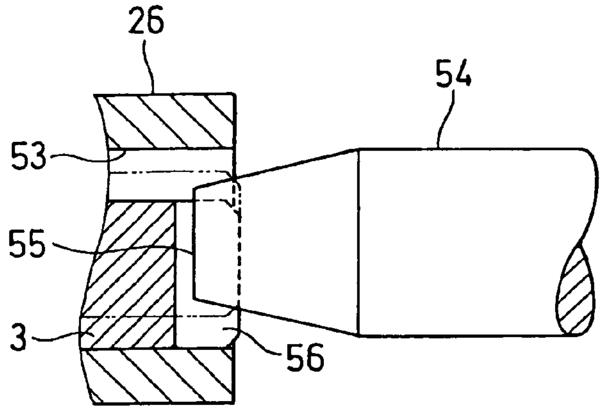
Figure 10C:
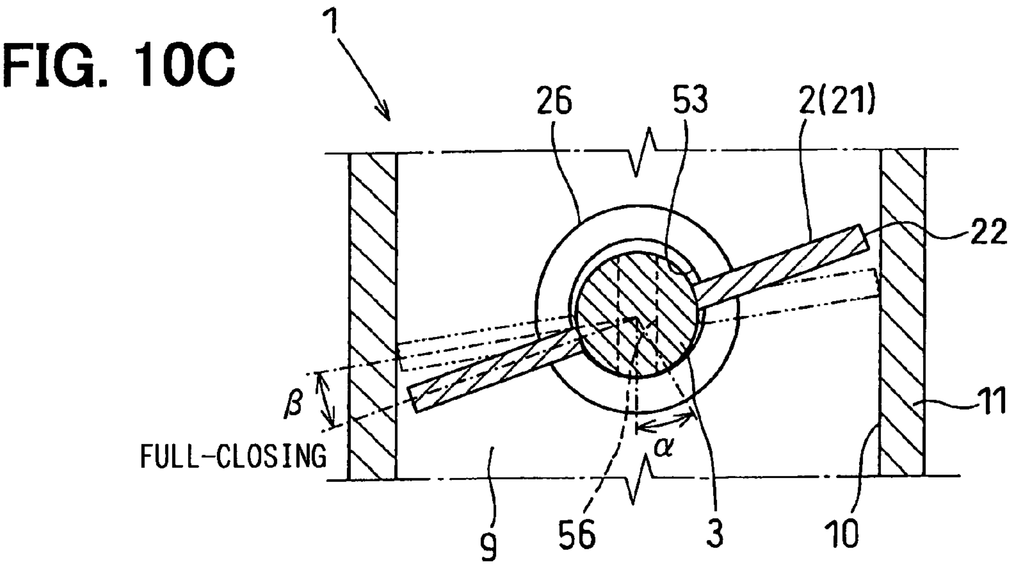

The position of valve full-closing indicates the rotation angle of the throttle valve 2 and the throttle shaft 3, at which the predetermined clearance (full-closing clearance) is formed between the outer peripheral end surface 22 of the disk-shaped part 21 and the bore inner surface 10 of the bore wall portion 11, as shown by solid lines in FIG. 4. Specifically, as shown in FIG. 10C, the position of valve full-closing indicates the rotation angle of the throttle valve 2 and the throttle shaft 3, at which the outer peripheral end surface 22 of the disk-shaped part 21 does not mechanically touch, i.e., does not directly make contact with the bore inner surface 10 of the bore wall portion 11. Therefore, the position of valve full-closing is the position at a rotation angle $\beta°$ in the direction, in which the throttle valve 2 is opened, relative to the position, in which the outer peripheral end surface 22 of the disk-shaped part 21 mechanically touches the bore inner surface 10 of the bore wall portion 11. Preferably, the direction, in which the bit fitting groove 56 in the throttle shaft 3 is formed, is inclined by a rotation angle $\alpha°$ of the throttle shaft 3 at the position of valve full-closing, relative to the line perpendicular to the central axis passing through the center of the disk-shaped part 21 of the throttle valve 2 in the thickness-wise direction. Here, $\beta° \leqq \alpha°$.

Subsequently, a method for adjusting the full-closing clearance in this embodiment is described.

The tip blade 55 of the fitting bit 54 of the jig is fitted into the bit fitting groove 56 in the throttle shaft 3, so that the throttle valve 2 and the throttle shaft 3 are rotated for a predetermined rotation angle in the fitted hole 44 formed in the inner periphery of the valve gear 7. In this situation, simultaneously, the full-closing stopper part 47 of the valve gear 7 is abutted against the fully-closing stopper 17 of the throttle body 1. Thereby, the full-closing clearance is adjusted.

The adjusting the full-closing clearance is carried out by fine adjustment of relative rotation angle (mount angle) of the throttle valve 2 connected with the throttle shaft 3 and the valve gear 7. The fine adjustment is carried out, so that the predetermined full-closing clearance is defined between the outer peripheral end surface 22 of the disk-shaped part 21 of the throttle valve 2 and the bore inner surface 10 of the bore wall portion 11 of the throttle body 1. In this situation, the outer peripheral end surface 22 of the disk-shaped part 21 does not mechanically touch the bore inner surface 10 of the bore wall portion 11.

At this time, the jig restricts or constrains the throttle shaft 3 in the full-closing position of the throttle valve 2. That is, the throttle shaft is restricted in a full-closing leakage air flow amount adjusting position, in which the flow amount of the leakage air in the full-closing position is adjusted. When the throttle valve 2 and the throttle shaft 3 are rotated to the full-closing leakage air flow amount adjusting position, as shown in FIG. 10A, the jig restricts the throttle shaft 3 in the full-closing position of the throttle valve 2. Thereby, the direction, in which the bit fitting groove 56 is formed on the other axial end surface of the throttle shaft 3, and the axial direction of the average flow of intake air flowing in the throttle bore 9 are oriented in substantially the same direction.

In order to measure the flow amount of the leakage air in the full-closing position, the throttle body 1 is assembled to an engine for testing, or a vacuum pump, so that negative intake pressure is experimentally applied downstream of the throttle bore 9 in the flow direction of intake air. At this time, the throttle valve 2 is supported by the jig, so that the direction, in which the bit fitting groove 56 is formed, and the axial direction of the average flow of intake air flowing through the throttle bore 9 are oriented in a substantially the same direction. In this situation, the throttle valve 2 and the throttle shaft 3 are attracted to the side, on which the clearance between the outer peripheral surface of the throttle shaft 3 and the inner peripheral surface of the slide hole 53 of the bearing 26 is reduced. That is, the throttle valve 2 and the throttle shaft 3 are attracted to the downstream side in the direction of intake air flowing in the throttle bore 9, i.e., to the side, on which negative intake pressure is applied.

In this situation, the flow amount of intake air in this state is measured, and when the flow amount of intake air corresponds substantially to the flow amount of the leakage air in the full-closing position at the time of idling, the rotation angle of the throttle valve 2 is determined to be in the predetermined full-closing position. Thus, the work of adjusting the full-closing clearance may be terminated. After adjusting the full-closing clearance, one axial end, i.e., the coupling 27 of the throttle shaft 3 projecting outward from the end surface of the metallic member 42 in the inner periphery of the valve gear 7 is crimped. Thereby, the coupling 27 is at least partially subjected to plastic deformation and the multiple fitting projections 29 of the coupling 27 at least partially enter into the multiple fitting recesses 45. Thereby, relative rotation angle between the throttle valve 2 connected with the throttle shaft 3 and the valve gear 7 is defined, and relative rotating movement of the throttle shaft 3 and the valve gear 7 are restricted.

When the valve gear 7 is fixed to the one axial end of the throttle shaft 3, which is unified with the throttle valve 2, the jig is dismounted from the throttle shaft 3. In order to remeasure the flow amount of the leakage air in the full-closing position, the throttle body 1 is assembled to the engine for testing, or the vacuum pump, so that negative intake pressure is experimentally applied downstream of the throttle bore 9 in the flow direction of intake air. At this time, the one end of the coil spring 5 mounted to the outer peripheries of the spring inner periphery guides 16, 43 is hooked to the gear side spring hook of the valve gear 7, and the other end of the coil spring 5 is hooked to the body side spring hook of the throttle body 1.

Accordingly, the bias of the coil spring 5 causes the full-closing stopper part 47 of the valve gear 7 to abut against the fully-closing stopper 17 of the throttle body 1, so that the throttle shaft 3 unified with the throttle valve 2 is restricted, i.e., constrained in the fully closing position. The throttle valve 2 and the throttle shaft 3 are attracted to the side, on which the clearance between the outer peripheral surface of the throttle shaft 3 and the inner peripheral surface of the slide hole 53 of the bearing 26 is reduced. That is, the throttle valve 2 and the throttle shaft 3 are attracted to the downstream side in the flow direction of intake air flowing through the throttle bore 9, that is, to the side, on which negative intake pressure is applied. When the flow amount of intake air in this state is measured, and when the flow amount corresponds substantially to the flow amount of the leakage air in the full-closing position at the time of idling, it can be determined that the rotation angle of the throttle valve 2 can be adjusted to the predetermined full-closing angular position. Thus, the work of adjusting the full-closing clearance and the work of assembling the throttle control device are terminated.

Figure 11A:
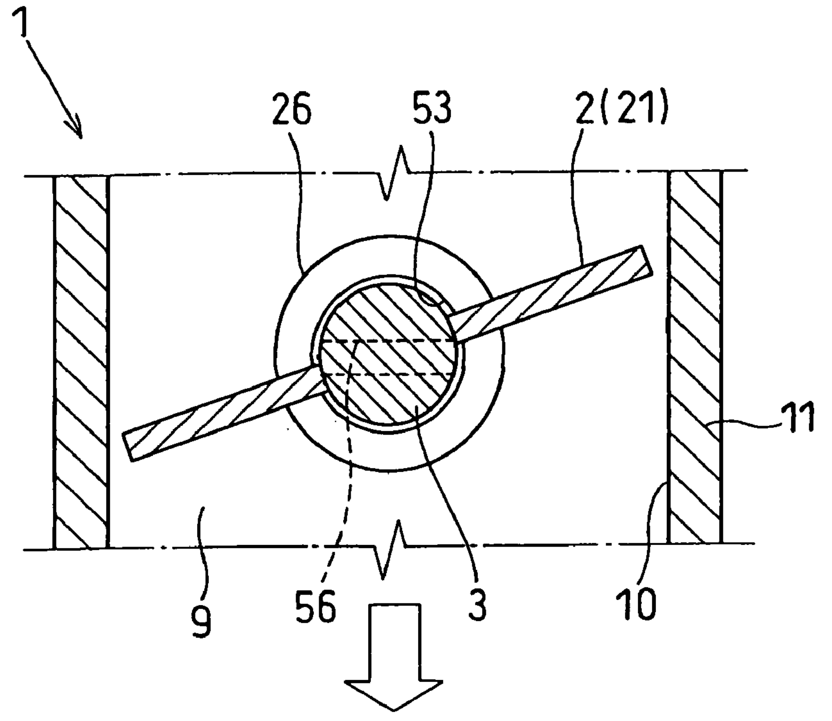
FIG. 11A RELATED ART
FIGS. 11A, 11B are cross sectional side views showing a throttle valve in a throttle control device according to a related art.
Figure 11B:
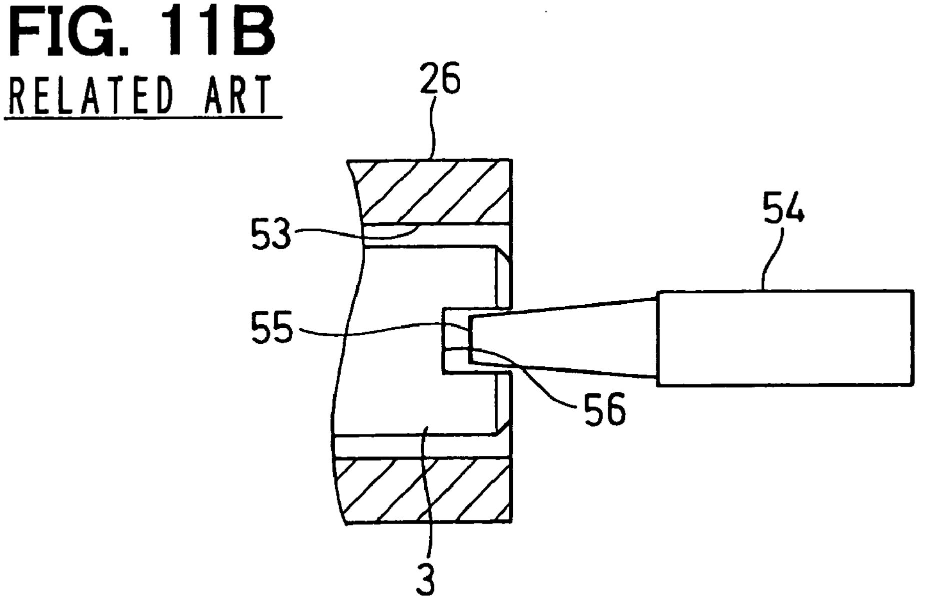
FIG. 11B RELATED ART

In a related art shown in FIGS. 11A, 11B, angular adjustment of the throttle shaft 3 is performed by fitting the tip blade 55 of the fitting bit 54 of the jig into the bit fitting groove 56 in the throttle shaft 3 and by rotating the throttle shaft. At this time, in this related art, adjustment of the flow amount of the leakage air in the full-closing position is performed in a state, in which the direction, in which the bit fitting groove 56 is formed, is positioned substantially perpendicular to the axial direction of the average flow of intake air flowing in the throttle bore 9. The position of the throttle shaft 3 is restricted, i.e., constrained by the tip blade 55 of the fitting bit 54 of the jig. In this situation, the clearance between the outer peripheral surface of the throttle shaft 3 and the inner peripheral surface of the slide hole 53 of the bearing 26 does not decrease, even if negative intake pressure is applied downstream of the throttle bore 9 in the flow direction of intake air. That is, the central axis of rotation of the throttle shaft 3 and the central axis of rotation of the slide hole 53 of the bearing 26 are maintained in a centered state.

Figure 12A:
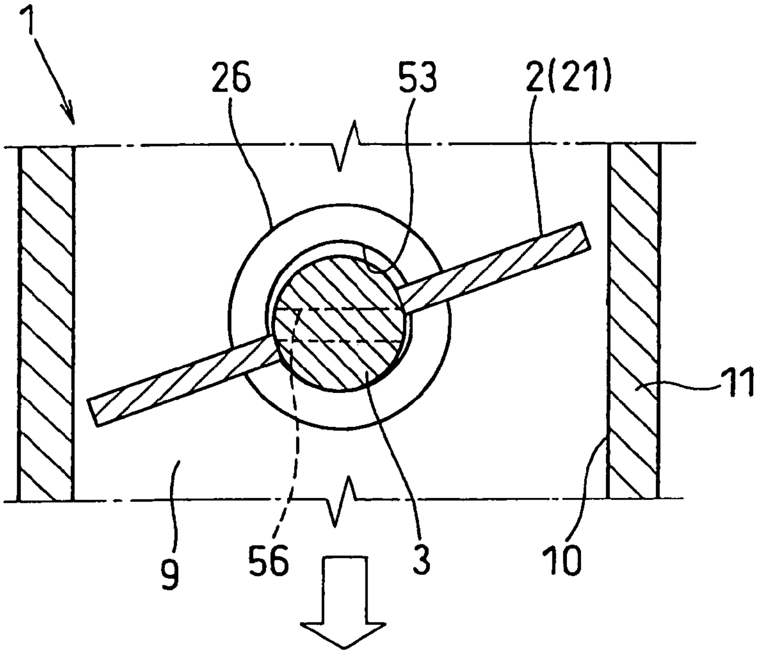
FIG. 12A RELATED ART
FIGS. 12A, 12B are cross sectional side views showing the throttle valve in the throttle control device according to the related art.
Figure 12B:
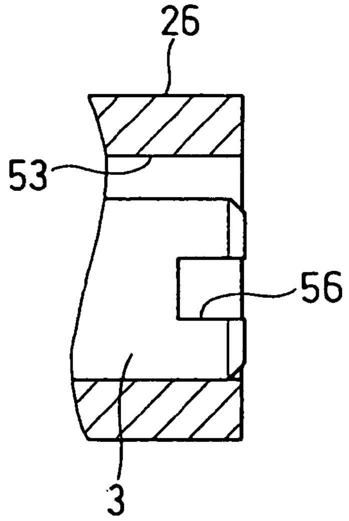
FIG. 12B RELATED ART
Figure 13:
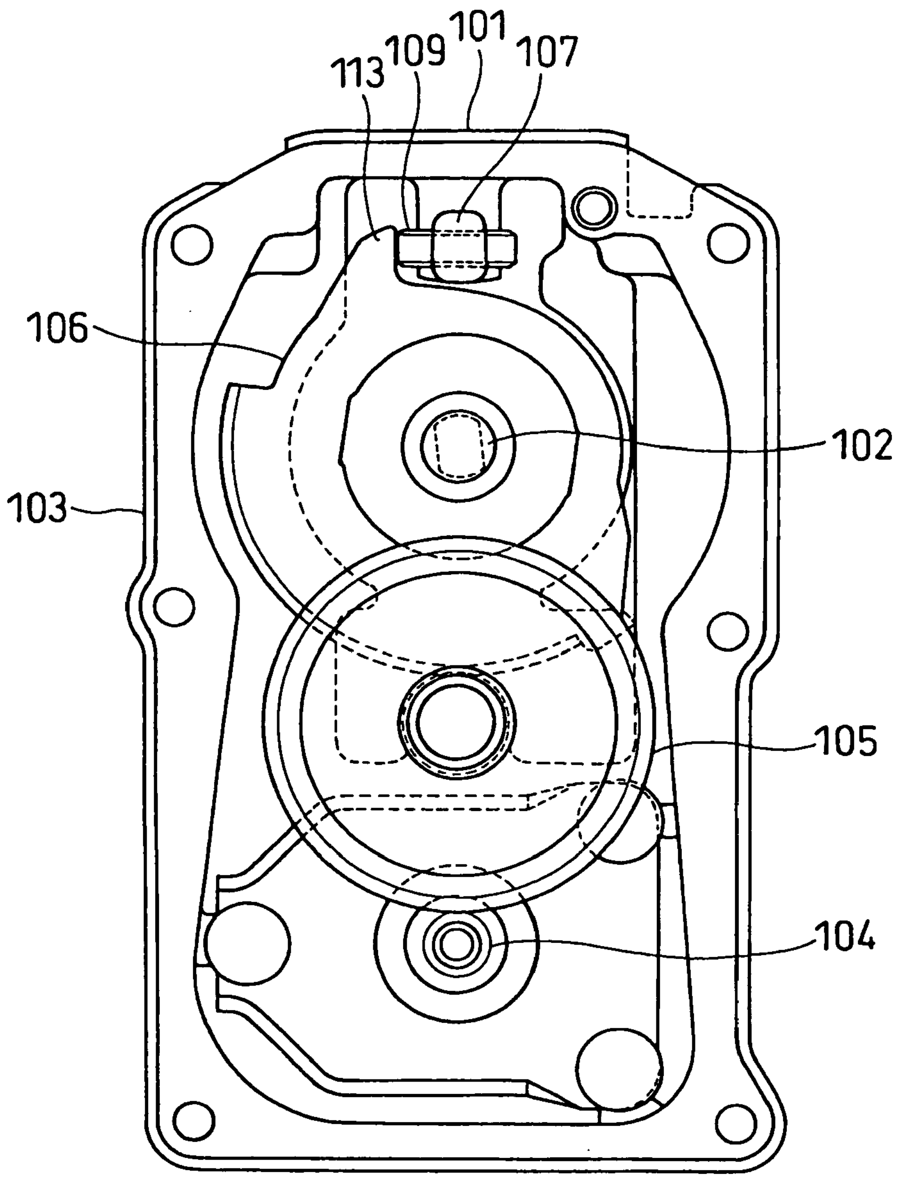
FIG. 13 PRIOR ART
FIG. 13 is a cross sectional view showing a throttle control device for an internal combustion engine according to a prior art.

After the full-closing adjusting work, in which the flow amount of the leakage air in the full-closing position is adjusted, the jig is removed from the bit fitting groove 56 in the throttle shaft 3. However, when the flow amount of the leakage air in the full-closing position is remeasured, the bit fitting groove 56 is not restricted by the tip blade 55 of the fitting bit 54 of the jig. Accordingly, as shown in FIGS. 12A, 12B, when negative intake pressure is experimentally applied downstream of the throttle bore 9 in the flow direction of intake air, the throttle valve 2 and the throttle shaft 3 shift in position to the downstream side in the flow direction of intake air. The degree of shifting the throttle valve 2 and the throttle shaft 3 corresponds to the clearance between the outer peripheral surface of the throttle shaft 3 and the inner peripheral surface of the slide hole 53 of the bearing 26. As a result, the full-closing leakage air flow amount at the time of the full-closing adjusting work differs from the full-closing leakage air flow amount after releasing the jig in the termination of the full-closing adjusting work. The full-closing leakage air flow amount in the full-closing adjusting work needs to be equivalent to the full-closing leakage air flow amount after termination of the full-closing adjusting work.

In this embodiment, the measurement of the full-closing leakage air flow amount is made in the state, in which the clearance between the outer peripheral surface of the throttle shaft 3 and the inner peripheral surface of the slide hole 53 of the bearing 26 is reduced. Specifically, the measurement is made in the state, in which the direction, in which the bit fitting groove 56 in the throttle shaft 3 is formed, and the axial direction of the average flow of intake air flowing through the throttle bore 9 are oriented to the substantially the same direction using the jig in the full-closing adjusting work. The average flow of intake air is in the direction along the central axis of the throttle bore 9. The tip blade 55 of the fitting bit 54 of the jig restricts the throttle shaft 3 at the full-closing position in the full-closing adjusting work.

In this situation, the throttle shaft 3 is not strongly restricted in the direction, in which the negative intake pressure is applied downstream of the throttle bore 9 in the flow direction of intake air, even when the fitting bit 54 of the jig is fitted to the bit fitting groove 56 in the throttle shaft 3. Therefore, the throttle valve 2 and the throttle shaft 3 can shift in position to the downstream side, even while the fitting bit 54 of the jig is fitted to the bit fitting groove 56.

Therefore, when the throttle shaft 3 is released from the jig and the full-closing leakage air flow amount is remeasured after the full-closing adjusting work, the full-closing leakage air flow amount in the full-closing adjusting work is not substantially varied from that after releasing the jig, even when negative intake pressure is applied downstream of the throttle bore 9. In this situation, the central axis of rotation of the throttle shaft 3 is shifted in position from the central axis of the slide hole 53 of the bearing 26 corresponding to the play between the outer peripheral surface of the throttle shaft 3 and the inner peripheral surface of the slide hole 53 of the bearing 26. Therefore, in the above throttle control device, in which the coupling 27 of the throttle shaft 3 is crimped and fixed to the metallic member 42 of the inner periphery of the valve gear 7, the flow amount of the leakage air in the full-closing position at the time of idling can be set at the predetermined appropriate amount.

[Modification]

In the above embodiments, the intake control device is applied to the throttle control device for the internal combustion engine, in which rotational torque of the actuator such as the motor 4 is transmitted to the throttle shaft 3 via the power transmission such as the reduction gear. Thereby, the rotation angle, i.e., the opening degree of the throttle valve 2 is controlled in accordance with the accelerator position. Alternatively, the intake control device may be adopted for a throttle control device, in which an actuator such as the motor 4 is not provided. In this case, in place of the valve gear 7 fixed to the throttle shaft 3, an accelerator lever (rotary driver) is mechanically connected to a throttle operating part such as an accelerator pedal of a four-wheel car, or a throttle lever or a throttle handle of a motorcycle, through the length of a wire cable. Even in this structure, the accelerator position, i.e. the throttle position manipulated by the driver can be transmitted to the throttle valve 2 and the throttle shaft 3.

In the above embodiments, in view of achieving low fuel consumption, lightening, and low cost, the throttle body 1 and the valve gear 7 (rotary driver) are formed of resin. The throttle body 1 includes the circular-tube shaped bore wall portion 11 defining the throttle bore 9 in the circular-shaped cross section. The valve gear 7 has the inner periphery, which is insert-molded with the metallic member 42, fixed with the magnet 51 and the yoke using an adhesive or the like. However, a non-circular valve-side fitting part of the throttle valve 2 and a non-circular shaft-side fitted part (valve holding part) of the throttle shaft 3 may be formed of resin. In this case, the shaft-side fitted part of the throttle shaft 3 may be fitted into the valve-side fitting part of the throttle valve 2, and the fitted portion may be fixed together by means of thermal welding such as laser welding.

The valve holding part 23 of the throttle shaft 3 in the above embodiments is formed to be the columnar shape (round shaft). Alternatively, the valve holding part 23 may be formed of a resin material to be in a cylindrical shape. In this case, the valve holding part 23 is used as a cylindrical shaft fitting part (resin shaft), and a metallic shaft (for example, stainless steel such as SUS304) is insert-molded in the shaft fitting part in a manner to have both ends or one end thereof exposed from the shaft fitting part. The throttle valve 2 may be integrally formed of a resin material. In this case, a cylindrical part is arranged in a disk-shaped part in the diametrical direction thereof to form the throttle valve 2, and the throttle shaft 3 is insert-molded in the cylindrical part.

In the above embodiments, a valve bias means, such as the coil spring 5, having the return spring function of biasing the throttle valve 2 in the closing direction is provided. Alternatively, a valve bias means, such as a coil spring, having the default spring function of biasing the throttle valve 2 in the valve opening direction may be provided. Alternatively, a valve bias means, such as one or two or more coil springs, having both the return spring function of biasing the throttle valve 2 in the closing direction and the default spring function of biasing the throttle valve 2 in the valve opening direction may be provided. The default spring function indicates a function of holding, latching, restricting, or constraining the throttle valve 2 at an intermediate position (intermediate stopper position) between the full-closing position and the full-opening position of the throttle valve 2 to enable a safe operation when supply of an electric power to the motor 4 is interrupted.

When a valve bias means, such as a coil spring, having the default spring function, is provided, the full-closing adjusting work may be conducted in an intermediate position (intermediate stopper position) between the full-closing position and the full-opening position of the throttle valve 2. The flow amount of the leakage air in the full-closing position is adjusted in the full-closing adjusting work (the full-closing clearance adjusting work). In this case, the full-closing adjusting work becomes an intermediate position (default position) adjusting work, in which a flow amount of intake air is adjusted, when the throttle valve 2 and the throttle shaft 3 are restricted (or constrained) at a rotation angle corresponding to the intermediate position to perform a safe operation.

The structures of the above embodiments can be combined as appropriate. The manufacturing methods of the above embodiments can be combined as appropriate.

Various modifications and alternations may be diversely made to the above embodiments without departing from the spirit of the present invention.

What is claimed is:

1. An intake control device for an internal combustion engine, the intake control device comprising:
- a throttle body that defines a throttle bore, which is substantially circular-shaped in cross section, through which intake air flows;
- a throttle valve that is rotatably assembled in the throttle bore, the throttle valve being in a shape corresponding to a cross section of the throttle bore;
- a shaft that rotates integrally with the throttle valve; and
- a rotary driver that is connected with one axial end of the shaft to change a rotation angle of the throttle valve via the shaft,
- wherein the rotary driver defines a hole, to which the one axial end of the shaft fits in a state of defining a clearance therebetween,
- the rotary driver defines a fitting recess that is dented radially outward from an inner wall surface of the hole, and
- the one axial end of the shaft includes a coupling that is crimped to the rotary driver in a state of fitting to the hole.

2. The intake control device according to claim 1, wherein the coupling is provided with a fitting projection that enters into the fitting recess in a state, in which the coupling at least partially causes plastic deformation when the coupling is crimped to the rotary driver.

3. The intake control device according to claim 1,
- wherein when the throttle valve is in a full-closing position, a clearance between an outer periphery of the throttle valve and a bore wall surface of the throttle body becomes minimum,
- the rotary driver includes an abutting part that rotates integrally with the throttle valve, and
- the throttle body includes a latch part, with which the abutting part of the rotary driver makes contact, to restrict a rotating motion of the throttle valve in the full-closing position relative to a closing direction.

4. The intake control device according to claim 3, wherein the full-closing clearance is adjusted by rotating the coupling in the hole to put the throttle valve in the full-closing position in a state, in which the abutting part abuts against the latch part.

5. The intake control device according to claim 1, further comprising:
- an actuator that is driven in accordance with a position of an accelerator operated by a driver; and
- a power transmission mechanism that transmits rotational torque of the actuator to the throttle valve via the shaft,
- wherein the rotary driver is a valve gear that is a component of the power transmission mechanism.

6. The intake control device according to claim 1, further comprising:
- a throttle sensor that includes a magnet, which is assembled integrally with the rotary driver to rotate in accordance with rotation of the throttle valve, and a magnetism detecting element, which opposes to the magnet, for detecting a rotation angle of the throttle valve, wherein the magnetism detecting element outputs a signal corresponding to a density of magnetic flux of the magnet making interlinkage relative thereto.

7. The intake control device according to claim 1, wherein the throttle valve is a butterfly rotary valve having a rotation axis in a direction substantially perpendicular to an axial direction of an average flow of intake air flowing through the throttle bore, the rotary driver varies a rotation angle of the throttle valve in a rotatable range between a full-closing position and a full-opening position, when the throttle valve is in the full-closing position, a clearance between an outer periphery of the throttle valve and a bore wall surface of the throttle body becomes minimum, and an amount of intake air drawn into a cylinder of the internal combustion engine becomes minimum, and when the throttle valve is in the full-opening position, the clearance between the outer periphery of the throttle valve and the bore wall surface of the throttle body becomes maximum, and the amount of intake air drawn into the cylinder of the internal combustion engine becomes maximum.

8. The intake control device according to claim 1, wherein the throttle body includes a valve bearing portion that holds a cylindrical bearing member, which supports the shaft rotatably in a rotating direction thereof, the shaft has an end portion on an opposite side of the one axial end thereof, which is coupled to the rotary driver, and the end portion of the shaft defines a bit fitting groove, which includes a minus groove.

9. The intake control device according to claim 8, wherein when the full closing position is adjusted to set the flow amount of leakage in the full-closing position of the throttle valve, the throttle valve and the shaft are regulated in rotation angle by a jig, so that a direction, in which the bit fitting groove is formed, is oriented to be substantially the same as an axial direction of an average flow of intake air flowing through the throttle bore, and the jig includes a fitting bit that is in a shape, which is capable of fitting to the bit fitting groove.

10. A method for manufacturing an intake control device including a throttle body rotatably receiving a throttle valve, the method comprising:

fitting a coupling, which is provided to one axial end of the shaft, into a hole formed in a rotary driver while defining a clearance therebetween;

abutting an abutting part, which is formed on the rotary driver rotatable integrally with a throttle valve connected with the shaft, against a latch part, which is provided to a throttle body;

rotating the coupling of the shaft in the hole formed in the rotary driver to put the throttle valve in a full-closing position, while the abutting part abuts against the latch part, to adjust a full-closing clearance between an outer periphery of the throttle valve and a bore wall surface of the throttle body; and crimping the coupling to be fixed to the rotary driver in the full-closing position.

11. The method according to claim 10, further comprising:

regulating the throttle valve and the shaft in rotation angle using a jig, such that a direction, in which a bit fitting groove is formed in the shaft, is oriented to be substantially the same as an axial direction of an average flow of intake air flowing through a throttle bore formed in the throttle body, when the full-closing clearance is adjusted.

12. The method according to claim 10, further comprising:

forming a fitting projection that enters into a fitting recess formed in the rotary driver by crimping the coupling to the rotary driver.

* * * * *